(12) United States Patent
Cameron et al.

(10) Patent No.: US 9,223,864 B2
(45) Date of Patent: Dec. 29, 2015

(54) METHOD AND SYSTEM FOR MAKING AND PLAYING SOUNDTRACKS

(71) Applicant: Booktrack Holdings Limited, Auckland (NZ)

(72) Inventors: Mark Steven Cameron, Auckland (NZ); Paul Charles Cameron, Auckland (NZ)

(73) Assignee: Booktrack Holdings Limited, Auckland (NZ)

( * ) Notice: Subject to any disclaimer, the term of this patent is extended or adjusted under 35 U.S.C. 154(b) by 0 days.

(21) Appl. No.: 14/041,541

(22) Filed: Sep. 30, 2013

(65) Prior Publication Data

US 2014/0052283 A1     Feb. 20, 2014

Related U.S. Application Data

(63) Continuation of application No. 13/002,634, filed as application No. PCT/NZ2009/000106 on Jun. 16, 2009.

(30) Foreign Application Priority Data

Jul. 4, 2008   (NZ) ........................................ 569618

(51) Int. Cl.
　　*G06F 17/00*　　(2006.01)
　　*G06F 17/30*　　(2006.01)
　　(Continued)

(52) U.S. Cl.
　　CPC .... *G06F 17/30772* (2013.01); *G06F 17/30029* (2013.01); *G06F 17/30056* (2013.01);
　　(Continued)

(58) Field of Classification Search
　　CPC .................... G06F 17/30029; G06F 17/30056;
　　　　G06F 17/30772; G11B 27/005; G11B 27/034;
　　　　　G11B 27/10; G11B 27/28; G11B 27/36;
　　　　　　　　　　　　　　　　　　　　G09B 5/04

USPC ............................................. 700/94; 381/164
See application file for complete search history.

(56) References Cited

U.S. PATENT DOCUMENTS 5,111,409  A   5/1992  Gasper et al.
5,611,018  A   3/1997  Tanaka et al.
(Continued)

FOREIGN PATENT DOCUMENTS

CA        2199245 A      3/1996
JP      H 05-314732     11/1993
(Continued)

OTHER PUBLICATIONS

Back, Maribeth et al.: "Listen Reader: an electronically augmented paper-based book", from Xerox PARC.
(Continued)

*Primary Examiner* — Fan Tsang
*Assistant Examiner* — Eugene Zhao
(74) *Attorney, Agent, or Firm* — Frommer Lawrence & Haug LLP

(57) ABSTRACT

A composite variable duration soundtrack for a user to play while reading a text source, the soundtrack duration being defined by a soundtrack timeline. The soundtrack comprises multiple sound layers configured to play concurrently through the soundtrack timeline, each sound layer having an arrangement of one or more audio features that are configured to play at preset start times in the soundtrack timeline. At least one sound layer is adapted for modifying the preset start and stop times of its audio features to match the reading speed of a user based on a reading speed input.

22 Claims, 15 Drawing Sheets

(51) Int. Cl.
  *G11B 27/034* (2006.01)
  *G11B 27/10* (2006.01)
  *G11B 27/28* (2006.01)
  *G11B 27/00* (2006.01)
  *G11B 27/36* (2006.01)
  *G09B 5/04* (2006.01)

(52) U.S. Cl.
  CPC ............ *G11B27/005* (2013.01); *G11B 27/034* (2013.01); *G11B 27/10* (2013.01); *G11B 27/28* (2013.01); *G11B 27/36* (2013.01); *G09B 5/04* (2013.01)

(56) References Cited

U.S. PATENT DOCUMENTS

| | | | |
|---|---|---|---|
| 6,195,640 B1 | 2/2001 | Mullaly et al. | |
| 6,263,308 B1 | 7/2001 | Heckerman et al. | |
| 8,209,623 B2 | 6/2012 | Barletta et al. | |
| 8,378,199 B2 | 2/2013 | Uehara | |
| 8,760,575 B2 * | 6/2014 | Gagnon | H04N 5/602 348/468 |
| 2002/0081560 A1 | 6/2002 | Ka-wah et al. | |
| 2002/0165880 A1 | 11/2002 | Hornsby et al. | |
| 2003/0043196 A1 | 3/2003 | Gibson | |
| 2003/0158735 A1 * | 8/2003 | Yamada et al. | 704/260 |
| 2003/0170604 A1 | 9/2003 | Mullen | |
| 2003/0200858 A1 | 10/2003 | Xie | |
| 2004/0080541 A1 | 4/2004 | Saiga et al. | |
| 2006/0075354 A1 | 4/2006 | Harpel | |
| 2007/0168413 A1 * | 7/2007 | Barletta et al. | 709/203 |
| 2007/0183753 A1 | 8/2007 | Kanno | |
| 2008/0005656 A1 | 1/2008 | Pang et al. | |
| 2008/0019667 A1 | 1/2008 | Uehara | |
| 2008/0140413 A1 | 6/2008 | Millman et al. | |
| 2008/0140702 A1 * | 6/2008 | Reed et al. | 707/102 |
| 2008/0319755 A1 | 12/2008 | Nishiike et al. | |
| 2009/0191531 A1 | 7/2009 | Saccocci et al. | |
| 2010/0149933 A1 | 6/2010 | Cervera Navas | |
| 2010/0153889 A1 | 6/2010 | Krause | |
| 2010/0324895 A1 | 12/2010 | Kurzweil et al. | |
| 2012/0054796 A1 | 3/2012 | Gagnon et al. | |

FOREIGN PATENT DOCUMENTS

| | | |
|---|---|---|
| JP | 2001-005837 A | 1/2001 |
| JP | 2004-029324 A | 1/2004 |
| JP | 2004-192560 A | 7/2004 |
| JP | 2005-346701 A | 12/2005 |
| JP | 2006-004409 A | 1/2006 |
| JP | 2006-331257 A | 12/2006 |
| WO | WO 96/07999 A | 3/1996 |
| WO | WO 97/22112 A | 6/1997 |
| WO | WO 01/11588 A | 2/2001 |
| WO | WO 2004/006209 A | 1/2004 |
| WO | WO 2006/100645 A | 9/2006 |
| WO | WO 2009/024626 A | 2/2009 |

OTHER PUBLICATIONS

Extended search report from European Patent Office for corresponding European application 09773808.2 dated Sep. 2, 2013.

Office action issued by Japanese Patent Office for corresponding Japanese application 2011-516195 dated Feb. 26, 2014, English translation only.

* cited by examiner

METHOD AND SYSTEM FOR MAKING AND PLAYING SOUNDTRACKS

This application is a continuation of U.S. patent application Ser. No. 13/002,634 filed Feb. 28, 2011 which is a 371 filing of PCT/NZ2009/000106 filed Jun. 16, 2009 and which claims priority to New Zealand application number 569618 filed Jul. 4, 2008, the disclosure of which are all incorporated herein by reference.

FIELD OF THE INVENTION

The invention relates to a method and system for making and playing soundtracks. In particular, but not exclusively, the soundtracks are for text sources, such as books, e-books, magazines, mobile phone text, reports, comic books, film scripts and the like.

BACKGROUND TO THE INVENTION

Books and other blocks of text are read usually silently but at different reading speeds depending upon the difficulty of the text and the reader's normal reading speed.

Some publishers provided audio books in the form of pre-recorded audio cassettes, compact discs, or internet downloads which provide a complete or an abridged narration of the book. They are an alternative to reading and are used by the blind to listen to books, or by those who prefer to listen rather than to read.

Soundtracks for books or other source text have not been successful as they may provide suggested background music but are not synchronised to the text on the page so add little to the reading experience.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide a method for making and/or playing soundtracks for text sources, and/or an improved soundtrack for text sources, or to at least provide the public with a useful choice.

SUMMARY OF THE INVENTION

In a first aspect, the present invention broadly consists in a composite variable duration soundtrack for a user to play while reading a text source, the soundtrack duration being defined by a soundtrack timeline and comprising: multiple sound layers configured to play concurrently through the soundtrack timeline, each sound layer having a arrangement of one or more audio features that are configured to play at preset start times in the soundtrack timeline, and wherein at least one sound layer is adapted for modifying the preset start times of its audio features to match the reading speed of user based on a reading speed input.

Preferably, each audio feature further comprises a preset stop time that determines when it stops playing in the soundtrack timeline, and wherein at least one sound layer is adapted for modifying the preset start and stop times of its audio features to match the reading speed of a user based on a reading speed input.

Preferably, at least one sound layer is adapted for modifying the preset start and stop times of its audio features to match the reading speed of the user based on the reading speed input such that the sound quality, pitch or tempo of the original audio feature is not altered.

Preferably, the soundtrack timeline is divided into a series of timeslot segments that correspond to a series of text chunks of the text source, each timeslot segment having a timeslot segment period, and wherein audio features of the sound layers are configured to start in a predetermined timeslot segment.

Preferably, the sound layers comprise a mixture of fixed reading speed sound layers in which the preset start times of the audio features of such layers are independent of the reading speed input, and variable reading speed sound layers in which the preset start and stop times of the audio features of such layers are dependent on the reading speed input such that the preset start and stop times of the audio features can be matched to the reading speed of the user.

Preferably, the variable reading speed sound layers comprise audio features having preset start and stop times that are defined as a percentage of the timeslot segment period, and wherein the timeslot segment period is based on the reading speed input such that the start and stop times of the audio features can be altered to match to the reading speed of the user.

Preferably, each audio feature has associated audio properties that dictate one or more playback effects associated with the playback of the audio feature. More preferably, the playback effects comprise any one or more of the following: fade in and out effects, looping effects, end of text segment rules, and transition effects.

Preferably, the audio properties of each audio feature comprise settings dictating transition effects associated with the audio feature if it is playing when the user initiates a transition from one timeslot segment in the soundtrack timeline to another timeslot segment, the transition effects determining the playback of the remaining portion of the audio feature.

Preferably, the audio properties of each audio feature comprise settings dictating transition effects associated with the audio feature if it is playing during at the end of a timeslot segment in the soundtrack timeline, the transition effects determining the playback of the remaining portion of the audio feature.

Preferably, the transition effects comprise any one of the following: continue playing, stop playing, fade-out, or loop. More preferably, the transition effects are configured to cause a gapless soundtrack playback between timeslot segment transitions so that the reading process is not disturbed.

Preferably, each text chunk corresponds to a page of text in the text source such that each timeslot segment in the soundtrack timeline corresponds to a page of the text in the text source.

Preferably, the soundtrack playback is configured to transition from the start of one timeslot segment to the start of the next timeslot segment in the series in response to a transition input. In one form, the transition input is generated by a remote device operable by the user. In another form, the transition input is generated by user operation of an audio player upon which the soundtrack is played.

In a second aspect, the present invention broadly consists in a method of producing a composite soundtrack for a user to play while reading a text source, the length of the soundtrack being defined by a soundtrack timeline, the method comprising the steps of: (a) creating multiple sound layers arranged to play concurrently during the soundtrack timeline; (b) inserting an arrangement of one or more audio features into each sound layer to play at preset start times in the soundtrack timeline, the preset start times of audio features of at least one sound layer being variable such that they are configured to depend on the reading speed of the user based on a reading speed input; and (c) compiling the sound layers and audio features into a soundtrack that is adaptable to match the reading speed of the user based on a reading speed input.

Preferably, the method further comprises the step of dividing the soundtrack timeline into a series of timeslot segments that correspond to a series of text chunks of the text source, each timeslot segment having a timeslot segment period, and wherein step (b) comprises configuring each audio feature to start in a predetermined timeslot segment.

Preferably, step (a) comprises creating a mixture of fixed speed sound layers in which the preset start times of the audio features of such layers are independent of the reading speed input, and variable reading speed sound layers in which the preset start and stop times of the audio features of such layers are dependent on the reading speed input such that the timing of audio features can be matched to the user's reading speed.

Preferably, step (b) comprises defining the preset start times of audio features of variable reading speed layers as a percentage of the timeslot segment period, and wherein the timeslot segment period is based on the reading speed input such that the start and stop times of the audio features can be matched to the reading speed of the user.

Preferably, the method further comprises the step of modifying the audio feature(s) of one or more of the sound layers after the soundtrack has been compiled. Preferably, the step of modifying the audio feature(s) of one or more of the sound layers comprises allowing the user to insert new audio features and/or replace audio features in the soundtrack timeline. More preferably, the new audio feature(s) comprise songs or music from the user's own music library.

In a third aspect, the present invention broadly consists in a method of making a soundtrack for a text source, the soundtrack comprising multiple layers of sound, each layer having one or more audio features, the method comprising the steps of: recording the required layers of sound of the soundtrack for the text source; producing the soundtrack in selected audio formats; producing software files to control soundtrack and audio feature transitions, and making the soundtrack and the software files available to a reader of the text source, wherein the start and stop time positions of audio feature(s) in at least one of the layers of sound are capable of being changed to match the customer's reading speed.

In a fourth aspect, the present invention broadly consists in a method of making a variable duration composite soundtrack particularly for a book, e-book, or other text source, the soundtrack comprising multiple audio features compiled into layers of sound and the method comprising the steps of: recording the required layers of the soundtrack for the text source; producing the soundtrack in selected audio formats; producing software files to control soundtrack and sound file transitions; and making the soundtrack and the software files available to a reader of the text source, wherein the playback of at least one of the layers of sound is capable of being matched to the reader's reading speed by altering the start and stop times of each audio feature in the soundtrack.

In a fifth aspect, the present invention broadly consists in a method of providing a variable duration composite soundtrack particularly for a book, e-book, or other text source, the soundtrack comprising multiple layers of sound divided into chunks, each chunk comprising one or more individual audio features and corresponding to a length of text in the text source, comprising the steps of: recording the required layers of the soundtrack for the text source such that at least one layer comprises audio features the position of which in the soundtrack is changeable to match a typical reader's reading speed; producing the soundtrack in selected audio formats; producing software files to control soundtrack transitions between the chunks of audio features; and making the soundtrack and the software files available to the reader.

In a sixth aspect, the present invention broadly consists in a method of selling a soundtrack for a book or other text source, the soundtrack comprising multiple layers of sound, each layer comprising one or more audio features, and wherein the playback of at least one of the layers of sound is variable such that it is capable of being matched to the customer's reading speed by changing the start and stop times of each audio feature in the sound layer, measuring the customer's reading speed and delivering a version of the sound track which substantially matches the customer's reading speed.

Preferably, the variable sound layer(s) comprise audio features that are timed to coincide with events described in the text source as they are read, the timing of the audio features corresponding to the customer's measured reading speed.

In a seventh aspect, the present invention broadly consists in a soundtrack for a book or other text source, the soundtrack comprising multiple layers of sound with at least one layer which includes sound effects timed to coincide with events described in the text source, the timing being related to the expected reading speed of a reader, and at least one other layer of sound which includes background or scene music.

In an eighth aspect, the present invention broadly consists in a method of making a variable duration soundtrack for a text source, the soundtrack comprising multiple layers of sound where the playback of at least one of the layers of sound is adjustable to a reader's reading speed by adjusting the start and stop times of the audio files and audio features that comprise the soundtrack, the method comprising the steps of recording the required layers of the soundtrack for the text source allowing for the playback of at least one of the layers of sound to be adjustable; producing the soundtrack in selected audio formats; producing software files to control soundtrack transitions; and making the soundtrack and the software files available to the reader.

In another aspect, the present invention broadly consists in a method of making a soundtrack particularly for a book, e-book, mobile phone text message or other text source, the soundtrack comprising multiple layers of sound, each layer having one or more audio features, the method comprising the steps of recording and mixing the required layers of the soundtrack for the text source, producing the soundtrack in selected audio formats; producing software files to control the audio feature transitions, and making the soundtrack and the software files available to the reader, wherein the start time positions of audio feature(s) in at least one of the layers of sound is capable of being changed to match the reader's reading speed.

In another aspect, the present invention broadly consists in a method of providing a soundtrack particularly for a book or e-book, the soundtrack comprising multiple layers of sound divided into chunks, each chunk comprising multiple individual audio features and each chunk corresponding to a length of text (typically a page in length), comprising the steps of: recording and mixing the required layers of the soundtrack for the book wherein the length of each chunk is changeable to match a typical reader's reading speed by varying the start times of the audio features in each chunk; producing the soundtrack in selected audio formats; producing software files to control soundtrack chunk transitions; and making the soundtrack and the software files available to the reader.

Preferably, the multiple individual audio features can run concurrently with each other but retain individual variable speed, duration and transition properties.

Preferably, one or more of the layers of sound comprise audio features representing sound effects, music and scene related sound, and each such audio feature has a start position that is based on a measured ratio between each significant sound effect or scene change in a chunk so that the sound effects and scene changes can be started and stopped to match a typical reader's reading speed.

Preferably, the reader can select their reading speed on an audio player or e-book and the start positions of the sound effect and scene related audio features in each chunk can be adjusted by a set ratio to match the variation in reading speeds.

Preferably, the sound layers comprise at least one variable duration sound layer in which the preset start and stop times of the audio features of such layers are dependent on a reading speed input representing the reader's reading speed such that the playback timing of the audio features in the layer can be matched to the reading speed of the user. More preferably, each audio feature has associated properties that control the transitions between the audio features to cause gapless transitions between chunks of the soundtrack. For example, the properties may comprise fade in/out or abrupt stop/start transitions between audio features playing at the time of a transition from one chunk of the soundtrack to the next. The transition properties of each audio feature may comprise rules for what the audio file being played does if the end of the page or text chunk is reached or selected, for example fade out or continue.

Preferably, the soundtrack may be configured to allow the reader to replace some audio features of some layers with audio features comprising songs from an existing music library of the reader by either choosing which songs to replace or the soundtrack software automatically replacing the songs based on selection criteria such as the popularity or genre of the songs or the musical characteristics such as beat, tempo or pitch. Preferably, if the reader decides to reconfigure the soundtrack with their own music from their music library, this will create a new soundtrack that the user will have the option to upload and resale as an alternative soundtrack to cater for different music taste or languages.

Preferably, at the time of purchase the average reading speed of the reader is determined, and the reader is provided with a version of the soundtrack for his chosen book which most closely matches his average reading speed.

Preferably, an external remote, audio player or e-book may be used to control the transition of the soundtrack from page to page of the text source.

Preferably the audio player, remote or e-book can be triggered as the page is turned which cues the various audio features that pertain to that page at a rate and timing that is predetermined by the reading speed previously set to commence.

In another aspect, the present invention broadly consists in a method of selling a soundtrack for a book, e-book or other text source, the soundtrack comprising multiple layers of sound where the soundtrack audio file's start and stop times of at least one of the layers of sound is capable of being matched to the customer's reading speed, measuring the customer's reading speed and delivering a version of the sound track which most closely matches the customer's reading speed.

Preferably, "the at least one layer of sound" includes sound effects or atmospheric sound timed to coincide with events described in the book or other text source, the timing related to the customer's measured reading speed.

Preferably, the soundtrack or at least the "at least one layer of sound" is produced in two or more variants to match different expected reading speeds, and the version chosen for sale is matched as closely as possible with the measured reading speed of the customer.

In another aspect, the present invention broadly consists in a soundtrack for a book or other text source, the soundtrack comprising multiple layers of sound with at least one layer which includes sound effects timed to coincide with events described in the book or other text source the timing being related to the expected reading speed of a customer, and at least one other layer of sound which includes background music.

In another aspect, the present invention broadly consists in a book or other text source and a matching soundtrack for that book or other text source, the soundtrack comprising multiple layers of sound with at least one layer which includes sound effects timed to coincide with events described in the book or other text source, the timing being related to the expected reading speed of a customer, and/or at least one other layer of sound which includes background music.

In another aspect, the present invention broadly consists in a method of making a soundtrack particularly for a book, the soundtrack comprising multiple layers of sound where the playback start and stop times of soundtrack audio files of at least one of the layers of sound is adjustable to a reader's reading speed comprising the steps of recording the required layers of the soundtrack for the book allowing for the playback start and stop times of the each individual audio file that make up the soundtrack of at least one of the layers of sound to be adjustable, producing the soundtrack in selected audio formats, producing software files to control soundtrack transitions and making the soundtrack and the software files available to the reader.

Preferably the soundtrack is playable through an audio player or e-book and controllable by a remote device, e-book or the audio player.

Preferably, the audio player or e-book is capable of interfacing with the remote device and/or a computer connected directly or wirelessly.

Preferably, the remote device is capable of synchronizing the soundtrack with pages of the book.

Preferably, the selected audio formats are digital audio formats such as mp3, wma, aac and other known digital audio formats.

Preferably, the soundtrack contains multiple soundtrack files.

Preferably, the soundtrack contains a single soundtrack file and an associated data file.

Preferably, the soundtrack may include songs from a music library located on the audio player or on a computer.

Preferably, the songs may be matched to the chapters or pages of a book by beat, tempo or pitch.

The phrase "text source" as used in this specification and claims, unless the context suggests otherwise, means any form of reading material whether it is in a hardcopy printed form or electronic copy, including, but not exclusively, a book, e-book, mobile phone text message, magazine, report, comic book, film script or the like.

The phrase "text chunk" as used in this specification and claims means a predefined length of text in the text source, the text source being divided or segmented into a series of text chunks of a length that may be defined in various ways depending on the embodiment, including, by way of example only, a page of text, a group of pages, a chapter, a page of mobile phone text, a predefined number of words or any other measure of text length appropriate to the particular text source.

The phrase "audio player" as used in this specification and claims means all devices and systems, portable or otherwise, that are capable of playing a digital audio file or soundtrack for producing sound, including devices such as Personal Computers, PDAs, MP3 players, mobile phones, i-pods and e-book systems, or any other audio system.

The phrase "audio feature" as used in this specification and claims includes audio sounds consisting in a digital audio file or recording that make up the sound for the soundtrack.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF DRAWINGS

Preferred embodiments of the invention will now be described by way of example only and with reference to the accompanying drawings, in which.

DETAILED DESCRIPTION OF THE PREFERRED EMBODIMENTS

The invention relates to a composite soundtrack for a text source, such as a book, e-book, mobile phone text book or any other form of reading material, and an associated method and system for making and playing the composite soundtrack. In particular, the soundtrack may be played by a user as they read the text source to enhance their enjoyment of reading experience. The soundtrack is customised to the particular text source and can be customised to match a user's reading speed and music taste.

With reference to FIGS. 1-4, a first preferred embodiment and variants of the composite soundtrack, method and system will be described. Following this, a second preferred embodiment of the composite soundtrack, method and system will be described with reference to FIGS. 5-20. It will be appreciated that aspects and features of the first preferred form composite soundtrack, system and method may be adopted and applied to the second preferred form, and vice versa.

First Preferred Embodiment

Figure 1:
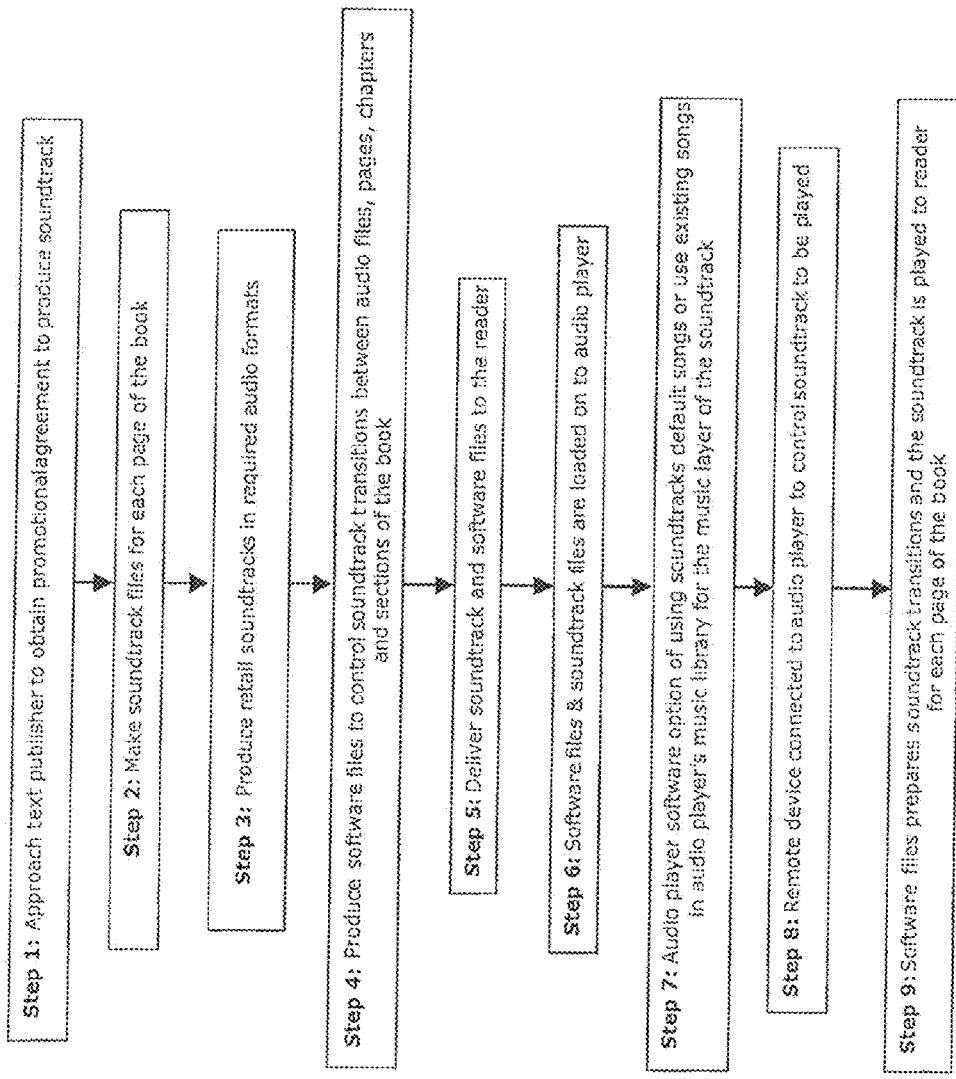
FIG. 1 is a flow chart showing the steps of making a soundtrack in accordance with a first preferred embodiment of the invention.

FIG. 1 shows a method for making a soundtrack in the context of a text source in the form of a book and starting from the point of obtaining a book publisher agreement to produce the soundtrack to the point of making the soundtrack available to the reader. The described order of steps is only a non-limiting example, and the steps may be performed in any order. Also it should be noted that some steps can be omitted depending on the use and implementation of the produced soundtrack. The following paragraphs describe each step and the different options available for each step.

As shown in step 1 of FIG. 1, prior to producing a soundtrack for a book the publisher of the book may be approached so that an agreement could be reached to promote the soundtrack along with book. It is advantageous if the publisher of the book agrees to publish all versions of the book with the same text content and page numbering to allow for a single soundtrack to be valid for all book versions published.

In the first preferred embodiment, the soundtrack is preferably produced comprising separate soundtrack files for each page of the book, although optionally the separate soundtrack files could match each chapter or a group of pages of the book (step 2). The soundtrack is a composite soundtrack preferably consisting of many sound layers, each layer having one or more audio features such as sound effects (e.g.: gun shots, doors slamming, phone ringing), background music (e.g.: orchestral music, band songs), and atmospheric noise (e.g.: weather sounds). The sound layers play concurrently together such that multiple audio features from different layers can concurrently play together. The audio features are strategically placed within their respective layers to match events happening in the book as the reader reads the text. All the layers are then combined together to form a single soundtrack. The exact positioning and timing of the audio features is important for proper matching of the soundtrack to the text of the book. Professional audio equipment such as mixing and dubbing equipment can preferably be used for this step.

Once the soundtrack is prepared, it is encoded in one or more preferred audio formats, such as, by way of example only, mp3, wma, aac, and other known digital audio formats, as required by a variety of readers (step 3). In the first preferred embodiment, variations of the soundtrack are produced to run at many different reading speeds. For simplicity, 3 speeds are described in this specification, namely for low, medium and fast readers by way of example only. However, in practice it will be appreciated that an unlimited number of variants of each soundtrack based on the expected reading speeds of customers can be produced.

To achieve this, the placement of audio features in one or more of the layers of sound in the soundtrack can be varied within a page as required for the different reading speeds. In the first preferred embodiment, one of these 'variable reading speed layers' would be the sound effects layer of the soundtrack or other layers when a change of scene took place. Therefore, the audio features in the sound effects layer of the slow reading speed soundtrack are much more spread out than the audio features of the fast reading speed soundtrack. However, the ratios of time between the audio features of the different reading speed soundtracks would be equal to each other. This method ensures that the sound effects will be correctly timed to play when the reader is reading the appropriate text on the page of the book. The position of the audio features in other layers of the soundtrack, such as layers comprising certain background music and scene noise that run from the beginning of a page, would be the same in the soundtracks produced for the different reading speeds, and are referred to as 'fixed reading speed layers'. In the first preferred embodiment, the background music and the scene noise layers are configured to play for a longer time in the low reading speed soundtrack than the fast reading speed soundtrack to account for the longer time taken to read a page.

The next step is to produce software files to control the transitions of the soundtrack between pages, chapters, sections, and the audio features of the sound layers (step 4). The software is able to control the transitions between the audio features of the sound layers of the composite soundtrack so that there are gapless transitions between pages, fade in/out or abrupt stop/start transitions between audio features. The software files are arranged to preferably provide a continuous sound output throughout the duration of the book or relevant text chunk of the book, such as a chapter. Furthermore, the software files may be configured to allow the reader to replace some layers of the soundtrack or specific audio features of a layer with sound layers or audio features from their own music library. For example, the software files may be configured to allow a reader to replace the entire background music layer of the soundtrack or specific audio features within that layer with songs from the reader's existing music library. The reader may either choose which songs to replace or the software files can automatically replace the songs based on selection criteria such as the popularity or genre of the songs or the musical characteristics such as beat, tempo or pitch. This capability enables the reader to create their very own individual or customised song layer within the soundtrack which could subsequently be uploaded to a website and resold as explained later.

In the next step the soundtrack and software files are delivered to the customer (step 5). The soundtrack is sold either via the internet directly or wirelessly or from a store. If the soundtrack is sold via the internet the soundtrack and software files could be downloaded over the internet directly or wirelessly, and if sold from a store all soundtrack files will be contained on storage media or downloaded at the store.

Figure 3:
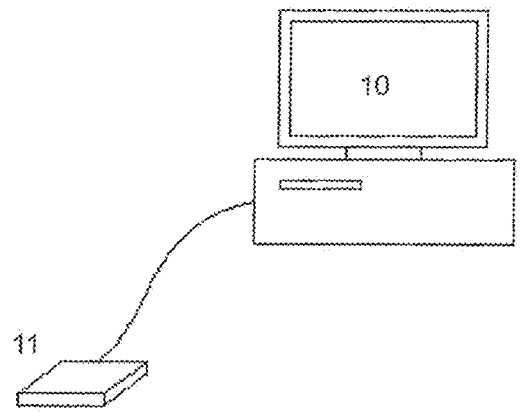
FIG. 3 is a diagram of an indicative hardware setup for loading the soundtrack from a computer to an audio player in accordance with a first preferred embodiment of the invention.

Once the soundtrack and software files are produced and sold to a reader, (step 6) the soundtrack and software files may be loaded from a computer 10 directly or wirelessly to an audio player 11 as shown in FIG. 3 or listened to directly from the computer while reading a book or e-book. The audio player 11 may be any commercially available audio player 11 which could provide the reader with the audible sound from the soundtrack. Preferably, the audio player 11 may be capable of playing any available digital audio formats such as mp3, wma or aac and also capable of executing software files produced for the soundtrack that control the playback of the soundtrack, including sound and page transition effects for example. The software files loaded on to the audio player preferably provide the reader the option of using the default songs of the soundtrack for the background music layer or use existing songs in the audio player's music library as explained later under example 5 of the variations section (step 7).

Figure 4:
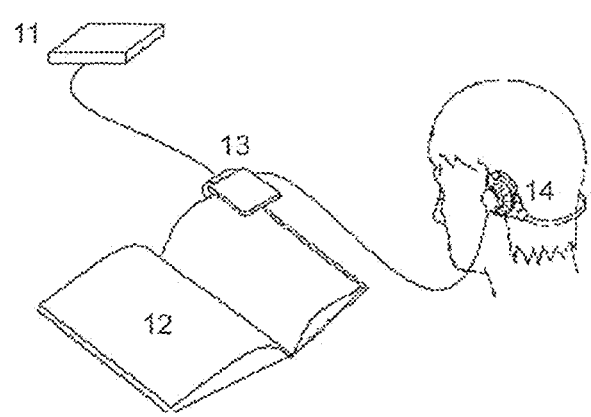
FIG. 4 is a diagram of an indicative hardware setup for playing a soundtrack made in accordance with the first preferred embodiment of the invention.

FIG. 4 shows a remote device 13 that may optionally be used to control the soundtrack files played from the audio player (step 8). The remote device 13 is preferably a handheld device or alternatively it may be attachable, for example by a clip or hook, to a book 12. In the first preferred embodiment, the remote device 13 includes a button that can be pressed when the reader decides to read the next page of a book 12 and the button triggers the software files to select and play the soundtrack file corresponding to that page or skip to the corresponding portion of the soundtrack relating to that page. Alternatively, the remote device 13 may have the capability to automatically detect when a page is turned by a page turn sensor. It may further include play, pause, next page, previous page buttons and an LCD display to display the page number being read. Some software data files may also be loaded onto the remote device 13 to control the transitions of soundtrack files or for transitioning through the soundtrack. The remote device 13 may also have a built in audio buffer memory which could buffer a short length of sound from the audio player 11 so that when the next soundtrack file is chosen to be played it can perform cross fading between soundtrack files. It could mix, fade, or merge the previous soundtrack file seamlessly with the next soundtrack file. The audio player 11 is not required to perform the cross fading of soundtrack files if this option is enabled.

In step 9, the software files loaded on to the audio player 11 prepare transitions between audio features of the sound layers of the soundtrack, including transitioning of the soundtrack through pages, chapters and/or sections of the book 12 so that the transitions are seamlessly executed when the soundtrack is played while reading the book 12. It will be appreciated that the sound could be carried to the reader from the remote device 13 through a pair of headphones 14 or a separate set of speakers.

Figure 2:
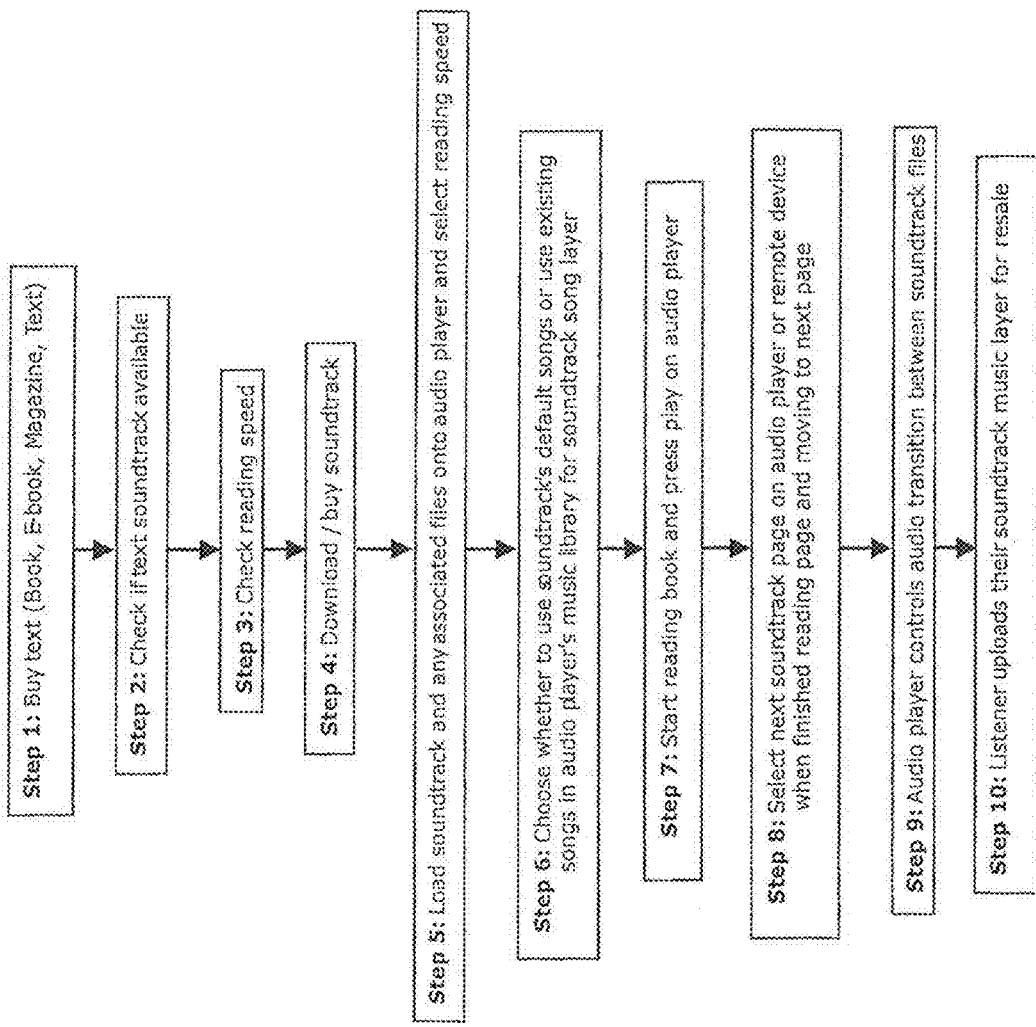
FIG. 2 is a flow chart showing how the soundtrack would be delivered to the customer in accordance with a first preferred embodiment of the invention.

FIG. 2 shows an example of the process involved in delivering the soundtrack to the reader. It is not necessary for the reader to complete all these steps depending on the individual method of sale being used.

In step 1 of FIG. 2, the reader buys a text source, such as a book, e-book, an online text, audible book or any other publication with text. The reader is able to check if a soundtrack for the selected book is available by looking for advertisements contained in the book, on the internet or other advertising mediums (step 2). Next the reader is urged to assess his or her reading speed by following written or audible instructions on a website or elsewhere (step 3). This may be done by reading a paragraph that is timed on a website. The reader may download the soundtrack and any associated software data files corresponding to his or her reading speed from an internet online store, or from a shop (step 4). The reader is able to load all the required soundtrack files and any associated software files on to their audio player (step 5). Next the software associated with the soundtrack allows the reader the option of modifying the soundtrack so that songs contained in a music library of the audio player may be used as a replacement to the songs of the soundtrack (step 6). If the reader prefers to use songs contained in a music library, they can select which songs in their music library to use in the soundtrack or have the software files automatically choose a selection of songs based on recent playlists, the most popular songs listened to, the song genre, the beat of the songs or a combination of these factors. In step 7, the reader may connect the audio player 11 to the remote device 13 which in turn is attached to a book 12 as shown in FIG. 3. Once the soundtrack and software files are loaded on to the audio player from a computer 10 the reader selects their reading speed and plays the soundtrack on the audio player and starts reading the book. Once the reader has read a page, the reader may select the next soundtrack file by pressing a button on the audio player 11 or remote device 13 as they turn over to the next page (step 8). In step 9, the software files control the transition between the soundtrack files as each soundtrack file is played according to the text being read on the book. The transitions provide a seamless soundtrack to the reader until he finishes reading the last page of the book. If the reader chooses to use their own songs for the songs of the soundtrack in step 6, they have the option of uploading the soundtrack with their own songs to a website as explained in step 10. Once uploaded, the soundtrack could be resold as an alternative to the original soundtrack of the book to cater for varying music taste or languages.

Variations of the First Preferred Embodiment

The following examples describe possible variations of the first preferred embodiment of the soundtrack, method and system described above.

EXAMPLE 1

In this example, a soundtrack file is created for each page of a book such as a novel as described above. Each page soundtrack file is a combination of layers of music and background sounds matching the mood and environment of the page and the sound effects matching the events in the book as they happen on that page. There are multiple versions generated to match varying readers speed so that the sound effects and scene sounds will match events happening in the book as the reader reads the page.

The reader assesses their reading speed on a website by reading a paragraph that is timed. The complete soundtrack containing the software files and the soundtrack files for the required reading speed can then be purchased and downloaded from an online music retailer website.

All the downloaded soundtrack files for the book are loaded onto an audio player. The reader selects each page soundtrack file to be played when the reader commences reading each page by selecting a track that matches the page number on an audio player or a remote device that may be attached to the book.

Software files associated with the soundtrack may automatically cross-fade page soundtrack files when they are selected. This fades out the volume of the previous track as the volume of the next track is slowly increased so that there is no audio gap between page soundtrack files as this may ruin the mood of a scene in the book.

EXAMPLE 2

In this example, a single soundtrack file is created for an entire book that also has an associated data file. The data file contains details that would allow the audio player to determine how the soundtrack file is divided up for each page of the book. This file is loaded on to the audio player and it indexes the soundtrack file so that a segment of it can be played for each page of the book when selected by the user. The reader would select the audio segment of the soundtrack corresponding to each page of the book using a remote device or directly on the audio player in the same way described in example 1. All other aspects of this example would be the same as described previously.

EXAMPLE 3

The soundtrack produced for this example includes a base track on which sound effects and background music would be layered over, where the base track changes at the appropriate point while reading a book, e.g. end of chapter or start of a new scene. The base track may be played over multiple groups of text or pages. The audio player and the remote device synchronises the sound effects for each page of the book as the reader clicks a next page button on the remote device or a button provided on the audio player. Software files are produced that accommodate this feature by loading a data file associated with the soundtrack that commands the audio player to play the appropriate base track for the required groups of text or pages, and synchronise the sound effects of each page and music over the top of the base track. All other aspects of this example would be the same as described previously.

EXAMPLE 4

In this example, the software files produced for the soundtrack have the ability to automatically calculate the reader's reading speed based on the time taken for the reader to turn to the next page of a book. The time would be measured from the audio player or remote device by timing from the point of time where the reader selected to play a soundtrack file to the point where they selected the next soundtrack file. It would then automatically adjust the timing of at least one layer of sound of the next soundtrack file, preferably the sound effects layer, so that it would match the time taken to read the previous page. The timing of the sound effects of the next page is automatically adjusted by the software according to the time taken to read the previous page, so that the sound effects closely matches the events happening in the next page. The start time of other layers such as background music and scene noise would also be extended or shortened to match the length of time taken to read the previous page. This example allows for the variations of the reader's reading speed while reading a book and matches the reader's reading speed on a continuous basis until the last page is read. All other aspects of this example would be the same as described previously.

EXAMPLE 5

This example may be used in conjunction with any of the above examples where the software files allow the reader to replace some layers of the soundtrack such as the background music layer with songs from an existing personal music library in the audio player or a computer. The reader is provided with the option of selecting the specific locations of the soundtrack where they wish the preferred songs to be played through the use of software files. Alternatively, songs may be automatically chosen by software files based on song categories such as popularity, genre, beat, or other measures. The software files may also suggest the mood or type of activity occurring in a scene corresponding to a particular soundtrack file and enable the reader to more accurately pick appropriate music to add to the background music layer of the soundtrack file.

Furthermore the soundtrack files may be produced with intentional gaps in the background music layer or song layer so that they could be automatically filled with songs the reader has loaded on their audio player. The software files loaded on to the audio player will determine a selection of songs which could be placed in the gaps of the soundtrack based on selection criteria such as the popularity or genre of the song. It may also be possible for the software files to automatically choose songs from the audio player based on beat, tempo or pitch of the songs. All other aspects of this example would be the same as described previously.

Furthermore the reader has the option to deselect from playing all other sound layers in the soundtrack except for the personalised music they have incorporated into a user generated music sound layer of the soundtrack from their own music selection and which will play at the moment in the book that has been designated for a user generated "soundtrack song". This may be a part of the book with a heightened importance or emotive piece of text that will benefit from a "soundtrack song" of the user's choice. This enables a reader to listen to their audio player as described previously but also have their chosen or favorite song(s) played as they are reading the most important or emotive part of the book or text without any background or scene audio sound layers being played.

If the user decides to change the music they would have created their own soundtrack and would be given the option of uploading it back to a website for resale.

EXAMPLE 6

This example may be used in conjunction with any of the above examples except the reader utilises a website to make their personalised soundtrack selections including reading speed and replacing some layers of the soundtrack, such as the background music layer, with songs from either their own existing music library via upload to the website, or from a selection of options on the website, e.g. author's choice, most popular, country music theme, etc. A list of type of song required may be provided, e.g. sad, action, scary, etc., from which the reader can determine which song they wish to fill each spot in the soundtrack. Once the reader has made all selections, the soundtrack will be produced by the website and made available to the reader to download. This soundtrack can be a single soundtrack or have multiple layers as described in the above examples. The reader has the option of making this soundtrack available for others to upload for which a fee may be charged.

EXAMPLE 7

This example may be used in conjunction with any of the above examples where the soundtrack is specifically produced for the text of an e-book or electronic print media. Preferably the option to download the soundtrack would be available at time of purchase of the e-book or electronic print media. The playback of the soundtrack files could be calibrated to the text of the e-book displayed on a computer display through the use of software files. The software files could match the playback of each soundtrack file to the rate at which the pages of an e-book are selected by the reader. The soundtrack files could be played from the computer used for reading the e-book or through a separate remote device controlling an audio player. The remote device would be capable of receiving a cue signal via a connected cable, or wirelessly, from the computer used for reading the e-book when a page of the e-book is turned by the reader. This would be similar to the reader clicking the next page button of the remote device in example 1 so that the next soundtrack file is played. All other aspects of this example may be the same as described previously.

EXAMPLE 8

This example may also be used in conjunction with any of the above examples where the soundtrack includes an additional voice layer containing an oral reading of the book as in an audio book. The software files would provide an option to the reader of turning the voice layer of the soundtrack on or off through the use of the audio player. This gives the reader the option to read the text while listening to the soundtrack or have the book read to him or her while also listening to the soundtrack. All other aspects of this example would be the same as described previously. Preferably each version of the soundtrack (calibrated to the customer's expected reading speed) would have the oral reading layer set at the same speed or be able to adjust to the oral reading speed.

EXAMPLE 9

This example has an additional feature that can be incorporated into any of the above listed examples, where the soundtrack includes an additional layer of sound containing a commentary or explanatory notes from the author or someone else that can be selected to play or mute. This is useful for educational purposes or for giving the reader insight in to the characters or the story plot of the book. All other aspects of this example may be the same as described previously.

EXAMPLE 10

In this example, the soundtrack produced could be used to help teach reading to children or second language skills. A soundtrack with a voice layer containing an oral reading of the book is produced which helps the reader while reading a book such that the audio voice starts loud and then decreases in volume over time as the reader progresses through the pages of the book. By utilising the automatic variable reading speed component the soundtrack layers described in example 4, the soundtrack could function as a virtual aid predicting where difficulties may occur judging by the time taken to read a page of a book and thus assisting the reader when the time taken to read a page is longer than a predetermined value. The assistance given to the reader may include making appropriate real noises associated with difficult words e.g.: moo for cow, voice over audio helping breakdown word sounds e.g.: because, be-cause, voice over audio that reads along that slowly diminishes and then only helps out on tricky words, a reading score can be input by the reader through the remote device and the soundtrack would automatically adjust how much help the reader receives. All other aspects of this example may be the same as described previously.

Second Preferred Embodiment

With reference to FIGS. 5-20, the second preferred embodiment of a preferred form composite soundtrack, and the method and system for producing and playing the soundtrack will be explained. The second preferred embodiment relates to an example of a composite digital soundtrack file format and the associated methods and systems for producing and playing the soundtrack.

Composite Soundtrack Overview

Figure 5:
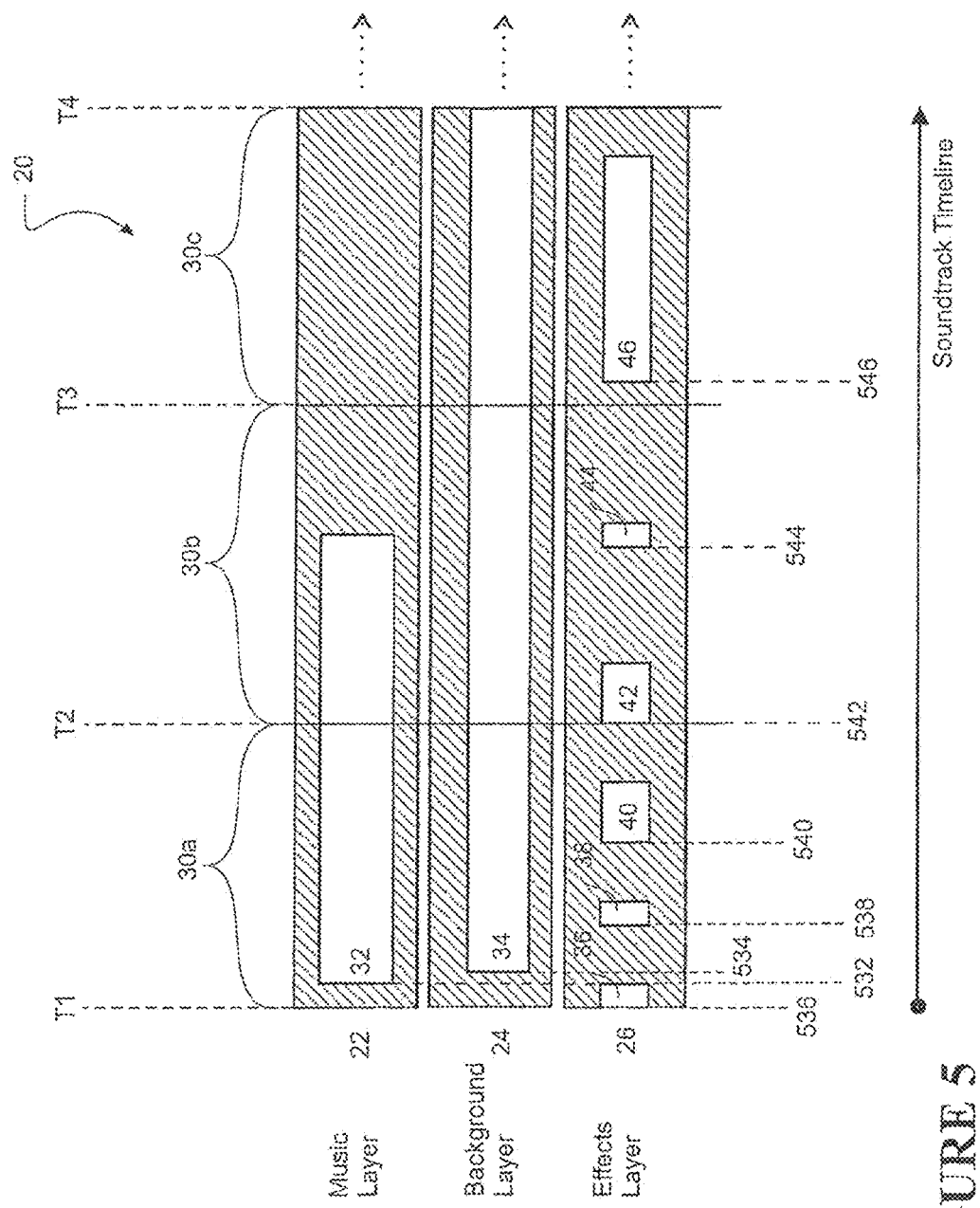
FIG. 5 is a diagram showing the sound layers of a composite soundtrack of a second preferred embodiment of the invention.

With reference to FIG. 5, a schematic representation of a preferred form soundtrack 20 is shown. The composite soundtrack 20 is multi-layered, and comprises two or more sound layers that run concurrently during playing of the soundtrack. By way of example, three sound layers 22, 24, 26 are shown, although it will be appreciated that any number of layers could be provided in other forms of the composite soundtrack. In the preferred form soundtrack 20, a music layer 22 is provided for background songs, a background layer 24 is provided for atmospheric noise, and an effects layer 26 is provided for sound effects that are timed with events happening in the text source. For example, the music layer 22 may comprise desired background music such as orchestral music or band songs, the background layer 24 may comprise weather sounds, scene noise or the like, and the effects layer 26 may include sound effects such as gunshots, door-slamming, lightning etc, that are timed to synchronise with events occurring in the text source.

In the preferred form, the sound layers 22, 24, 26 in the soundtrack timeline are segmented into a series of timeslot segments 30a, 30b, 30c. Likewise, the associated text source is divided or segmented into a series of text chunks. Each timeslot segment 30a, 30b, 30c in the soundtrack corresponds to a text chunk in the text source. Three timeslot segments 30a, 30b, 30c are shown in FIG. 5 by way of example, although it will be appreciated that the number of timeslot segments in the series will depend on the length of the soundtrack and its associated text source, and the soundtrack timeline may be any desired length. For the purpose of explanation, the text source will be a book and each text chunks corresponds to a page of that book. However, it will be appreciated that the text chunk segmentation may be varied to suit different types of text sources and requirements. For example, the text source could be segmented into text chunks that consist of groups of consecutive pages, chapters, length of text based on the number of words, or any other suitable segmenting regime. In the preferred form, the length of each text chunk is substantially equal, although the segmenting of the text source need not necessarily be equal in other forms.

In the preferred form, the duration or length of each timeslot segment 30a, 30b, 30c is arranged to correspond to the user's reading speed for the text source. For example, if the timeslot segments correspond to text chunks in the text source having a length of one page, and the reader takes 30 seconds to read one page, then the length of each timeslot segment is set to 30 seconds. In effect, the soundtrack timeline, consisting of a series of timeslot segments, is substantially equal to the user's reading timeline for the text source, consisting of a series of text chunks.

Figure 6:
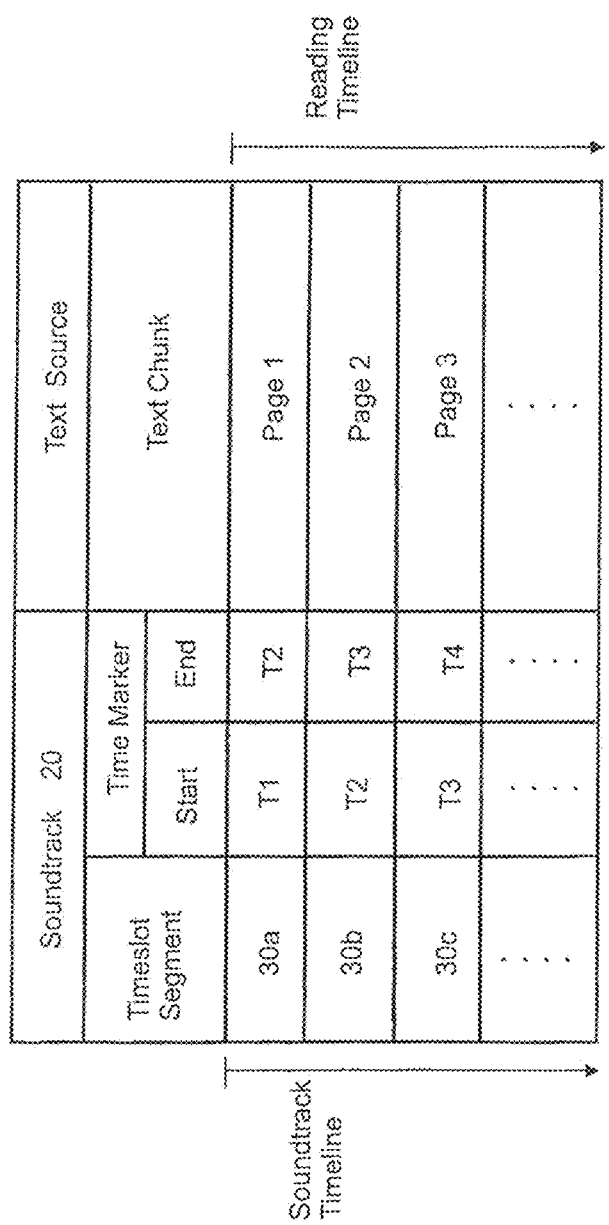
FIG. 6 is a table showing the soundtrack timeline of the composite soundtrack and corresponding reading timeline of the associated text source.

The timeslot segments are delineated from each other by time-markers T1, T2, T3, T4 that are located at spaced-apart intervals along the length of the soundtrack timeline. Each pair of adjacent time-markers defines a corresponding timeslot segment that extends across the sound layers 22, 24, 26. This relationship between the series of timeslot segments, time-markers and corresponding text chunks is shown in the table of FIG. 6. As shown, each timeslot segment 30a, 30b, 30c corresponds to an associated text chunk of the text source, which in this example is one page. The duration of the timeslot segments, referred to as the timeslot segment period, is set by the position of the time-markers corresponding to each timeslot segment. For example, timeslot segment 30a is delineated by start time-marker T1 and stop time-marker T2. Likewise, timeslot segment 30b is delineated by start time-marker T2 and stop time-marker T3 and so on for the remaining timeslot segments in the series.

Reverting to FIG. 5, each sound layer 22, 24, 26 comprises one or more audio features. The audio features are audio files that are arranged to play at a particular selected point during the timeline of the soundtrack. There may be multiple audio features within a single timeslot segment of a sound layer, or an audio feature may extend over multiple timeslot segments.

By way of example, music layer 22 is shown with a single audio feature 32, such as a song, that starts in timeslot segment 30a and ends in timeslot segment 30b. The background layer 24 comprises an audio feature 34, such as atmospheric or scene noise, that starts playing in timeslot segment 30a and continues playing through timeslot segments 30b and 30c. The nature of the music and background sound layers 22, 24 is such that their audio features are likely to play continuously over multiple consecutive pages of the book and therefore over multiple consecutive timeslot segments. In contrast, the effects layer 26 tends to comprise multiple audio features within each timeslot segment, as multiple events tend to occur within one page.

In the preferred form, each of the audio features in the various layers of the soundtrack has a predetermined or specified start position in the soundtrack timeline. The start position of the audio features in the soundtrack 20 of FIG. 5 are shown in the soundtrack timeline as S32, S34, S36, S38, S40, S42, S44, and S46. The end position of the audio features depends on the length of the audio file associated with the audio feature, or the audio feature may optionally be provided with a preset stop position that may vary with reading speed.

The soundtrack 20 is configured such that one or more of the sound layers may be matched to the user's reading speed. More particularly, the layers of the soundtrack may be defined as either 'fixed reading speed sound layers' or 'variable reading speed sound layers', and in some forms the soundtrack may have a mixture of fixed and variable reading speed sound layers. In other forms, the soundtrack will comprise sound layers that are all of the 'variable reading speed sound layer' type. The type of sound layer determines the nature of the start/stop positions of the audio features of that layer. By way of example, fixed reading speed sound layers play their audio features at preset positions in the soundtrack that are independent of the user's reading speed, whereas variable reading speed sound layers are employed for audio effects that are timed with events occurring in the text source and therefore the timing or position of the audio features in such layers is matched with and dependent on the user's reading speed.

For fixed reading speed sound layers, each audio feature has an absolute start position such that the audio feature starts at a predetermined time within the soundtrack timeline or within a particular timeslot segment, regardless of the user's reading speed or the timeslot segment period. For example, the music 22 and background 24 sound layers may be fixed reading speed sound layers such that their respective audio features 32 and 34 of have absolute start positions so that the audio feature starts at a predetermined time in the soundtrack timeline or within a particular timeslot segment independent from the user's reading speed. The same applies to the optional stop positions, if these are set for the audio features.

For variable reading speed sound layers, each audio feature has a variable start position that is based on the timeslot period of the timeslot segment within which the audio feature begins playing. In this respect, the timeslot segments of the soundtrack timeline have adjustable or variable timeslot segment periods that are set based on the user's reading speed. In this respect, the composite soundtrack can be considered as having an variable overall duration that is dependent on the user's reading speed In the preferred form, the variable start position may be a percentage or ratio start position that is determined based on the timeslot segment period of the timeslot within which the audio features starts. For example, if an audio feature, such as a sound effect, is to be played according to an event happening halfway into the page, then a variable start position of 50% of the timeslot segment period would be set. Referring to FIG. 5, the effects layer 26 may be a variable reading speed layer that is matched to the user's reading speed. Each of the audio features 36, 38, 40, 42, 44, and 46 of the effects layer 26 may have variable start positions such that their timing may be altered according to the user's reading speed according to a reading speed matching function to be explained. Likewise, each audio feature of variable reading speed sound layers may have a variable stop position that is dependent on the user's reading speed, if such optional stop positions are set for the audio features.

Figure 7:
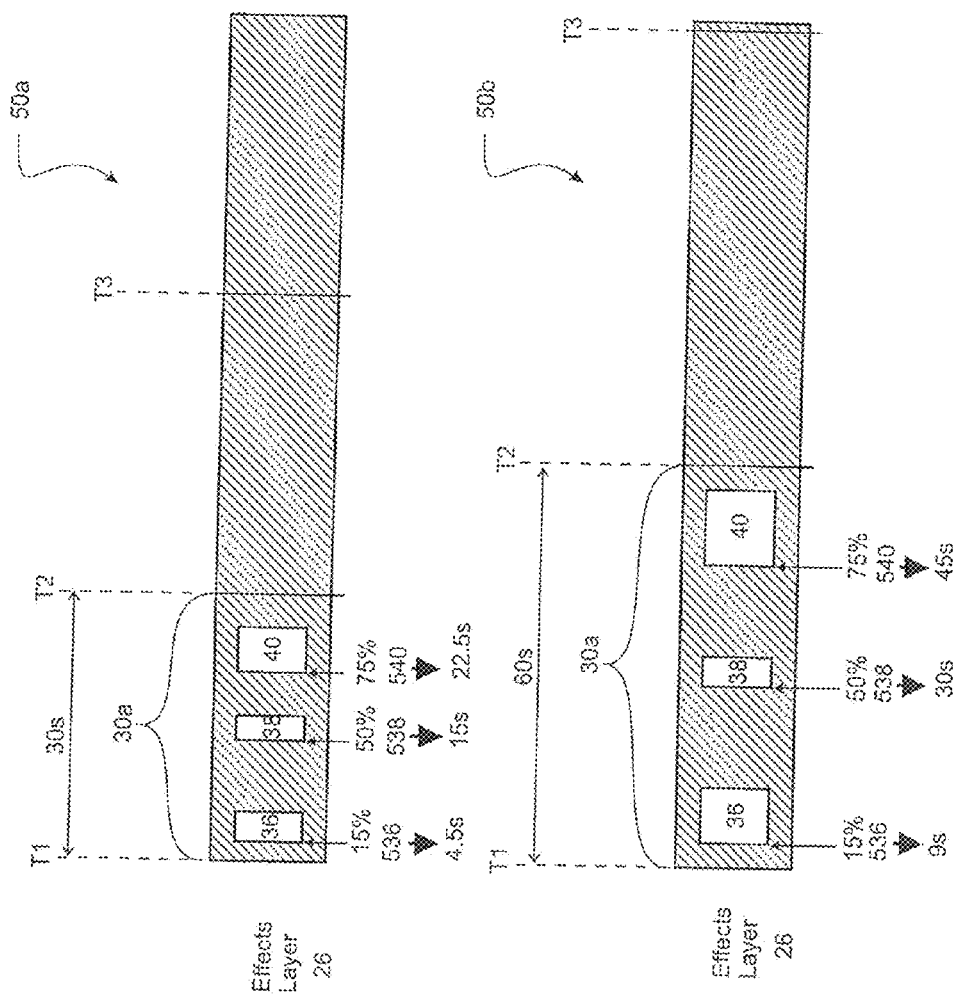
FIG. 7 is a diagram showing the modification of the soundtrack timeline between slow and fast reading speeds.

Referring to FIG. 7, the reading speed matching function associated with the soundtrack will be explained. In operation, the reading speed matching function is arranged to calculate the absolute start position of audio features in variable reading speed sound layers based on their percentage or ratio start positions and the timeslot segment period, which may be varied to match the user's reading speed. By way of example, FIG. 7 shows the effects layer 26 generally as 50a for a user's reading speed of 30 seconds per page, which translates to a timeslot segment period of 30 seconds. Timeslot segment 30a is shown having three audio features 36, 38, and 40, each having respective percentage start positions at 15%, 50%, and 75% of the timeslot segment period. Therefore, the reading speed matching function calculates the start positions of audio features in each timeslot segment using the following formula (1): Absolute start position=start time−marker of timeslot segment+(percentage start position×timeslot segment period).

By way of example, audio feature 36 begins at time T1+0.15×(T2−T1), audio feature 38 begins at time T1+0.5× (T2−T2), and audio feature 40 begins at time T1+0.75×(T2− T1), which translates to respective start times of 4.5 seconds, 15 seconds and 22.5 seconds after the start time-marker T1 of timeslot segment 30a. If a slower reader employs the soundtrack and their reading speed is 60 seconds for a page, the timeslot segment period may be altered to 60 seconds, and the above formula (1) employed by the reading speed matching function to re-calculate the absolute start positions of the audio features 36, 38, 40 as 9 seconds, 30 seconds, 45 seconds as shown in the modified effects layer shown as 50b.

As will be explained further below in regard to the soundtrack file format, each audio feature has associated audio properties. The properties at least include the start position, whether variable or fixed, within the soundtrack timeline and a link or file path to the associated audio file to be played. Additionally, the audio properties may comprise variable or fixed stop positions, start and stop effects such as fade-in, fade-out, fade-out timed, volume, looping, and play status in response to user interaction such as next page input, page skipping by the user, or what action to take when reaching the end of the page if the next page has not been selected by the user. In summary, these audio properties are assigned to each individual audio feature to controls how its respective audio file starts, stops and transitions during the soundtrack timeline, such as fade in, loop, continue on through a transition, stop and other properties that may be required to achieve a continuous and gapless soundtrack between text chunks of the text source.

Soundtrack File Format

It will be appreciated that the composite soundtrack may be packaged into various file formats and arrangements for interpretation and playing by corresponding audio software running on an audio player. By way of example only, a preferred form soundtrack file format will be described, along with corresponding preferred form soundtrack production and playing systems, although these file formats and arrangements may be altered to suit different format and audio software requirements.

Figure 8:
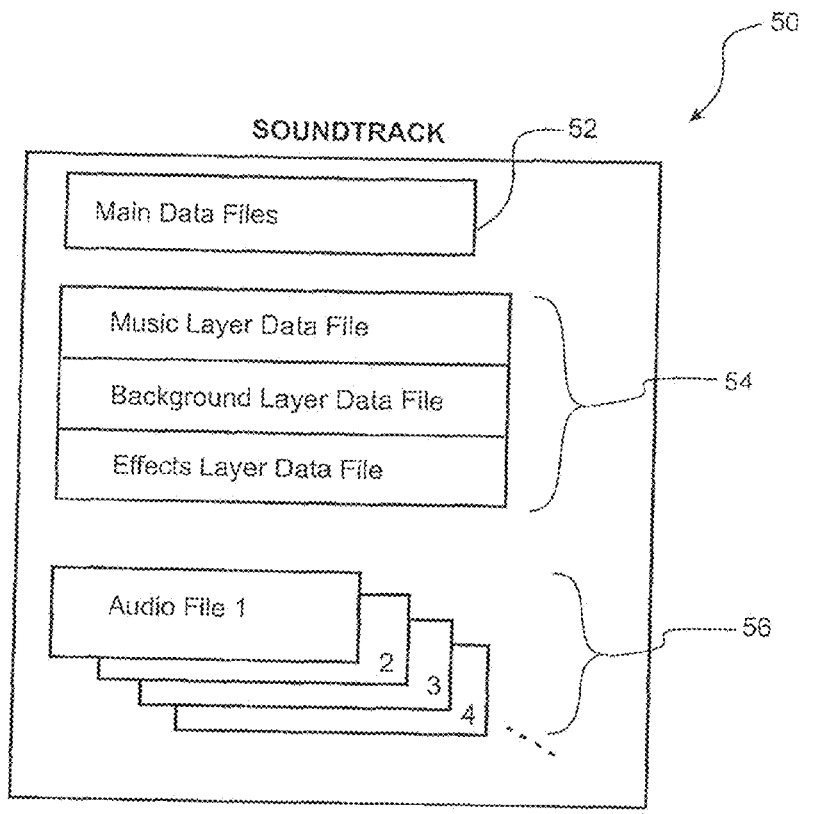
FIG. 8 is a block diagram showing the composite soundtrack file package format.
Figure 8:
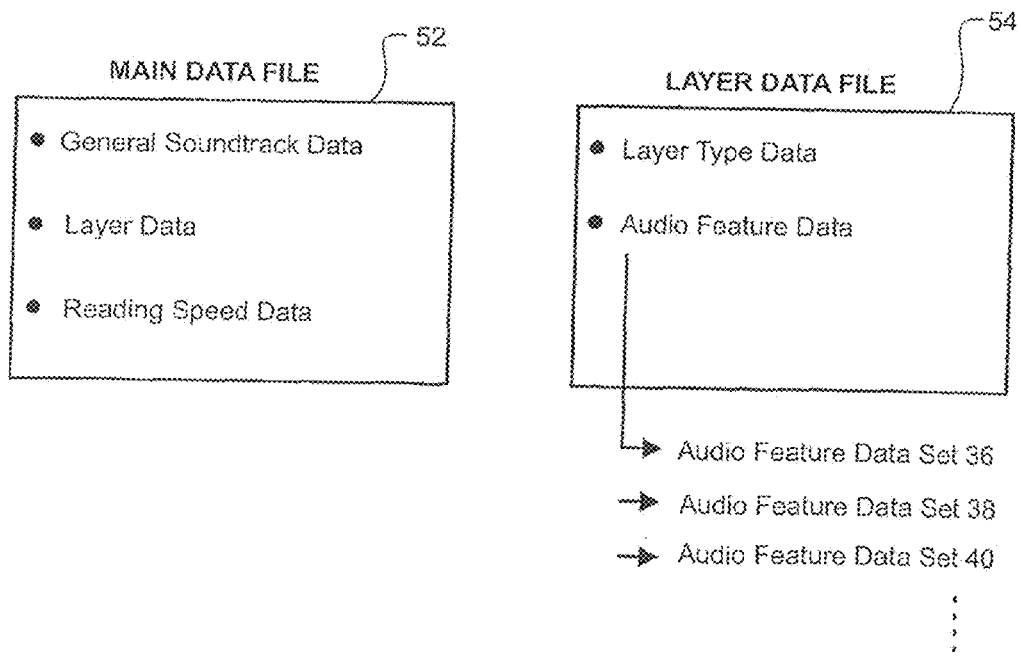

Referring to FIG. 8, the preferred form soundtrack comprises a package of files. The package of files preferably comprises a main data file 52, one or more layer data files 54 corresponding to each of the sound layers of the soundtrack, and optionally a set of audio files 56 that correspond to the various audio features of the soundtrack. It will be appreciated that the soundtrack may alternatively comprise only the data files 52, 54 and that the audio files 56 may be retrieved from a database or memory during playing of the soundtrack and in such forms the data filed may contain linking or file path information for retrieving the audio files from memory, a database or over a network.

In the preferred form, the main data file 52 preferably comprises general soundtrack data such as, but not limited to, the name of the soundtrack, length or duration of the soundtrack, associated text source name, and any other identification or necessary audio information or soundtrack information. In addition, the main data file comprises layer data comprising information about the number of sound layers in the soundtrack and the names of the sound layers. The layer data may also comprise filenames, file paths, or links to the corresponding layer data file 54 of each of the sound layers, which will be explained next. The main data file also preferably comprises reading speed data, which in the preferred form, comprises timeslot segment information relating to the soundtrack timeline, and for example includes the number of timeslot segments, timeslot segment period, and time-marker location in the soundtrack timeline. In operation, the main data file contains information that sets the frame-work of the soundtrack including the various sound layers and the soundtrack timeline segments. The particular audio features and positions of those audio features in each sound layer are then arranged on the soundtrack according to the corresponding information in the layer data files(s) 54.

In the preferred form, the soundtrack package contains a layer data file 54 for each of the respective sound layers in the soundtrack. Each layer data file 54 comprises layer type data, which designates whether the sound layer is a fixed reading speed sound layer or variable reading speed sound layer. As previously described, the variable reading speed sound layers contain audio features having an associated variable start position that is based on a percentage or ratio of the timeslot segment period calculated by the reading speed matching function. For the fixed reading speed sound layers, the associated audio features are provided with absolute or fixed start positions along the soundtrack timeline.

Each layer data file 54 also comprises audio feature data. This audio feature data provides information on the particular audio features associated with the sound layer. Each audio feature of the sound layer has an associated audio feature data set that contained the audio properties for that audio feature. By way of example, audio feature data sets for audio features 36, 38, 40 of the effects layer 26 are shown. In the preferred form, each audio feature data set comprises the fixed or variable start position of the audio feature, the associated timeslot segment in the soundtrack timeline within which the audio feature begins, a link or file path to the associated audio file, and optionally other audio feature properties including, for example, start and stop effects such as fade-in, fade-out, fade-out timed, volume, looping, and play status in response to user interaction such as next page input or page skipping by the user, as will be explained in more detail later.

It will be appreciated that the data and information relating to the soundtrack and its sound layers and audio features of each sound layer can be arranged in different file formats and data file configurations, and that the above is provided by way of example only.

Soundtrack System

In the preferred form, the soundtrack is produced and played by a corresponding soundtrack system. In general, the soundtrack system comprises software running on a hardware system. By way of example, the soundtrack system provides a soundtrack production system for compiling a soundtrack and a soundtrack playback system for playing the soundtrack. For clarity, both of the production and playback systems will be described separately, although it will be appreciated that both systems may be integrated in an overall soundtrack system if desired.

The soundtrack system software can be configured to run on any suitable hardware system or platform. By way of example only, the hardware system may be a general purpose computer, whether desktop, laptop or PDA, a mobile phone, e-book, portable audio player, such as an iPod or mp3 player, or a standalone hardware system. In brief, the hardware system requires a processor on which the software runs, memory, and preferably an output display, output listening device or audio output such as speakers or headphones, user interface and an input/output interface for connecting with other external devices. The hardware system may optionally have access to a database or other network in which audio files may be downloaded or accessed. It will also be appreciated that the soundtrack system may be provided in software applications running on a website. Additionally, the overall hardware system may be distributed across one or more devices on a network that communicate together.

Soundtrack Production System

Figure 9:
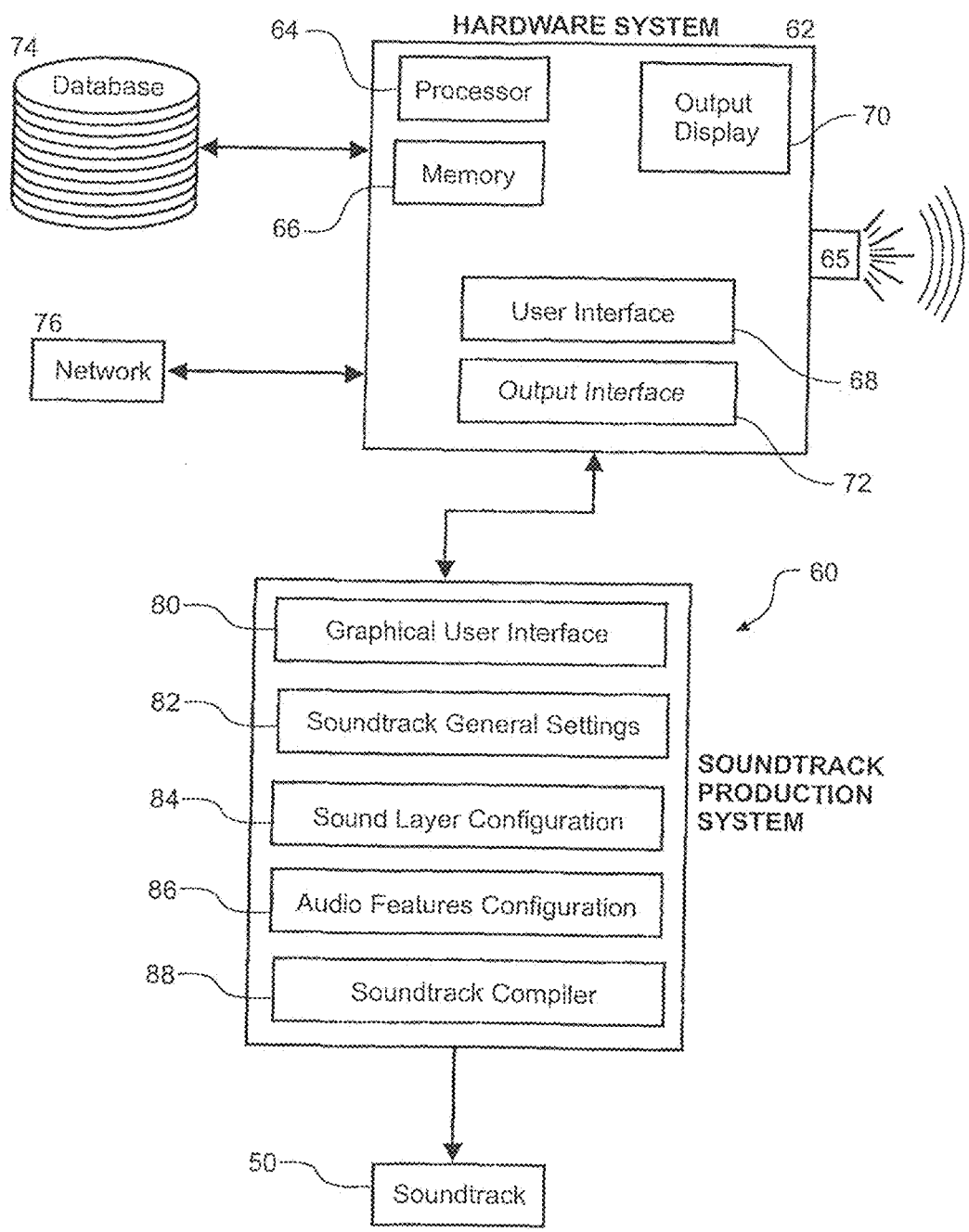
FIG. 9 is a block diagram showing a hardware system and software modules of the soundtrack production system in accordance with a second preferred embodiment of the invention.

Referring to FIG. 9, a preferred form soundtrack production system 60 is shown. As mentioned, the soundtrack system 60 is in the form of software running on a hardware system 62. As mentioned, the hardware system may be provided in various forms including general purpose computers, mobile phones, e-books, portable audio players, portable handheld computing devices or the like. In brief, the hardware system comprises a processor 64 on which the software runs, memory 66, a user interface 68 so that a user can interact with the software, an output display 70, which may form part of the user interface, and an input/output interface 72 for connecting to external device for downloading and uploading soundtrack files. The hardware system may comprise or have an associated database 74 that may be connected to a network 76, such as the internet. An audio output 65 in the form of speakers or headphones is also provided for converting the soundtrack audio output signal into audible sound.

By way of example, the main modules and functionality of the soundtrack production system 60 will now be described. The soundtrack production system includes a Graphical User Interface (GUI) 80 that is arranged to operate as the user interface on the output display. A soundtrack general settings module 82 is provided to enable a user to set the soundtrack data, such as title, associated text source, duration and the like. In the preferred form, the settings also include the user's reading speed setting, which may comprise a reading speed selection from an index scale from high to low reading speeds or any other form of reading speed indication, such as a time period required to read a page. Directly or indirectly, the reading speed setting may determine the timeslot segment period. As mentioned, each timeslot segment corresponds to a user defined text chunk of the associated text source. In the preferred form, the text chunk may be a page of the text source and therefore the timeslot segment period corresponds to the length of time taken for a user to read one page of the text. The general settings may also enable a user to configure the general soundtrack timeline, including the number and period of the timeslot segments and the type of text chunk each corresponds to, for example one page. This information can be configured to partition or segment the soundtrack timeline into pages, and groups of pages that form chapters for example.

A sound layer configuration module 84 is provided to enable a user to configure the number of sound layers in the soundtrack, including adding and deleting sound layers, and setting sound layer settings such as whether the sound layer is a fixed or variable reading speed sound layer.

An audio features configuration module 86 is arranged to enable a user to place audio effects at desired start positions in each timeslot segment of each of the sound layers over the soundtrack timeline. As a user inserts a new audio feature into a sound layer, the user may select the associated audio file that is played with the audio feature, set the fixed or variable start position of the audio feature in the desired timeslot segment of the sound layer, and other audio feature properties, such as start and stop effects that will be explained in more detail later.

Finally, the soundtrack production system comprises a soundtrack compiler 88 that is arranged to compile the data and information relating to the soundtrack timeline configuration, sound layer configuration and audio features set by the user into the required soundtrack data files previously described and outputting those files in a soundtrack package 50.

Figure 10:
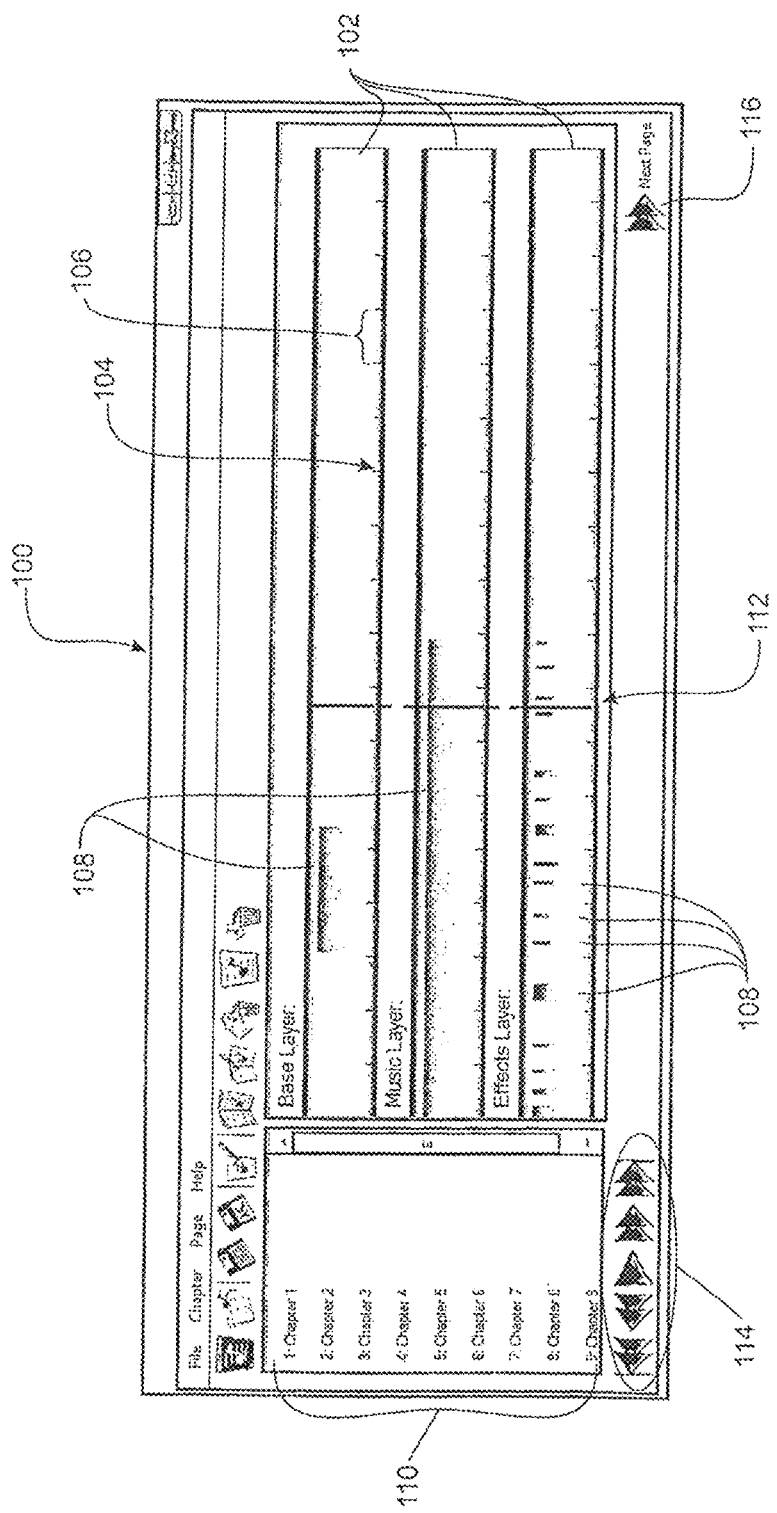
FIG. 10 is a screenshot showing a graphical user interface of the soundtrack production system software.

By way of example, a preferred form GUI 100 for the soundtrack production system is shown in FIG. 10. The GUI 100 shows a composite soundtrack being created with three sound layers 102. Each sound layer 102 is provided with a series of equally spaced time-markers 104 that delineate the timeslot segments 106. The various shaded blocks 108 represent the audio features set to play in each of the sound layers. As previously described, the user can configure the number of layers and layer names using the sound layer configuration module 84. In the preferred form GUI 100, each timeslot segment 106 is set to represent a text chunk of one page of the associated text source. Therefore, each time-marker 104 represents the start of a new page. For convenience, a series of consecutive timeslot segments can be grouped into a chapter of pages so that the audio features in a specific chapter of the soundtrack timeline can be navigated easily. By way of example, the chapter selection ability is shown in panel 110. A soundtrack progress bar 112 representing the progress of the soundtrack when it is played is also provided. In particular, progress bar 112 moves across the soundtrack timeline from left to right to show where the soundtrack is playing in the soundtrack timeline. Playback controls 114 are provided to enable a user to play, fast forward, rewind, slow rewind, stop and pause the playback of the soundtrack as needed when testing the soundtrack being created. A "next page" button 116 is also provided that enables the user to jump the playback to the start of the next timeslot segment which mimics the user selecting next page.

Figure 11:
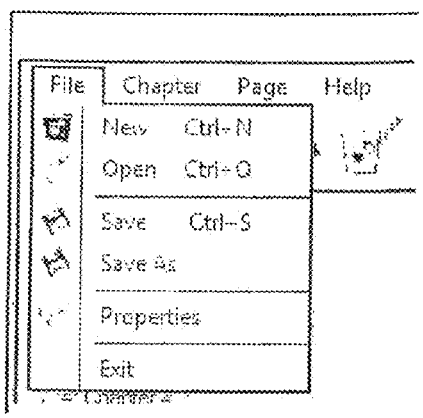
FIG. 11 is a screenshot showing the file menu of the soundtrack production system software.

FIG. 11 is the file property menu of the GUI 100 that enables the user to create new soundtracks, open existing soundtracks and save soundtracks to memory, such as a hard drive.

Figure 12:
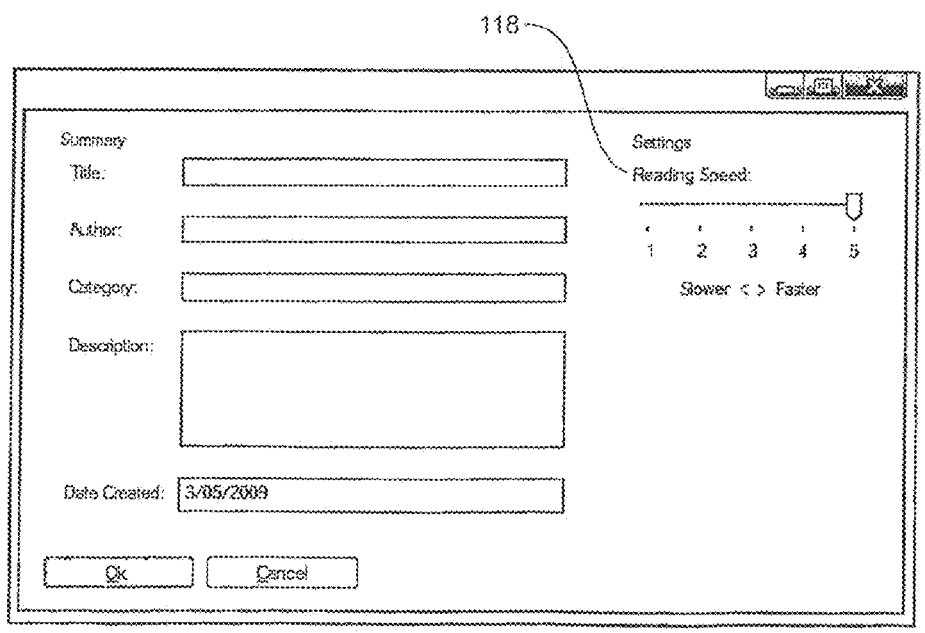
FIG. 12 is a screenshot showing the soundtrack properties information box of the soundtrack production system software.
Figure 13:
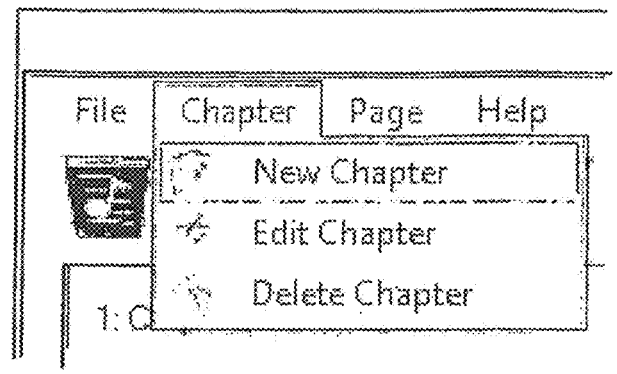
FIG. 13 is a screenshot showing the soundtrack chapter menu of the soundtrack production system software.
Figure 14:
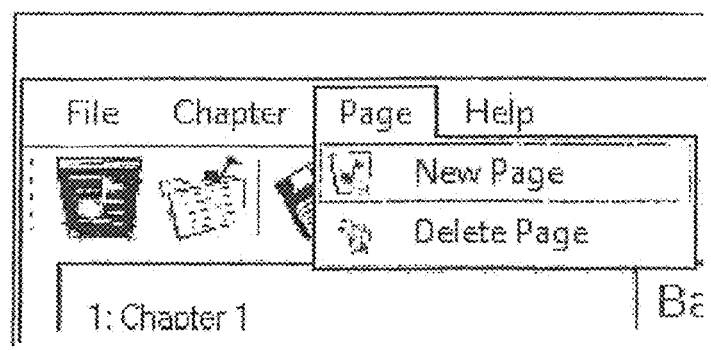
FIG. 14 is a screenshot showing the page menu of the soundtrack production system software.

FIG. 12 shows the information box for the soundtrack properties, and which enables a user to enter a soundtrack title, author, category and a description, which may include the title of the associated text source that the soundtrack was created for. A reading speed scale input 118 is also provided and this is used by the soundtrack general settings module 82 to set the timeslot segment period to correspond to the reading speed of the user. It will be appreciated that the reading speed input need not necessarily be provided in the form of an index scale, but could be entered as a time period if desired. By way of example, the preferred form reading speed scale input ranges from the fastest reading speed 5, representing 30 seconds to read a page, and increasing in 30 seconds increments per integer, to the slowest reading speed 1, representing 150 seconds to read a page. It will be appreciated that the scale may be continuous and need not necessarily be provided in an integer scale. In operation, the reading speed scale input 118 may be altered to match the user's reading speed and this causes the reading speed matching function to modify the soundtrack timeline and audio feature start positions of the variable reading speed sound layers, such as the effects layer. In particular, the time-markers 104 and the period of the timeslot segments 106 in the soundtrack timeline are altered to reflect the new reading speed and the absolute position of the audio features in the variable reading speed sound layers are re-calculated and repositioned according to their percentage start positions. FIG. 13 and FIG. 14 show the chapter and page menus for adding, editing and deleting page and chapter segments to the soundtrack timeline in accordance with the sound layer configuration module 84.

Figure 15:
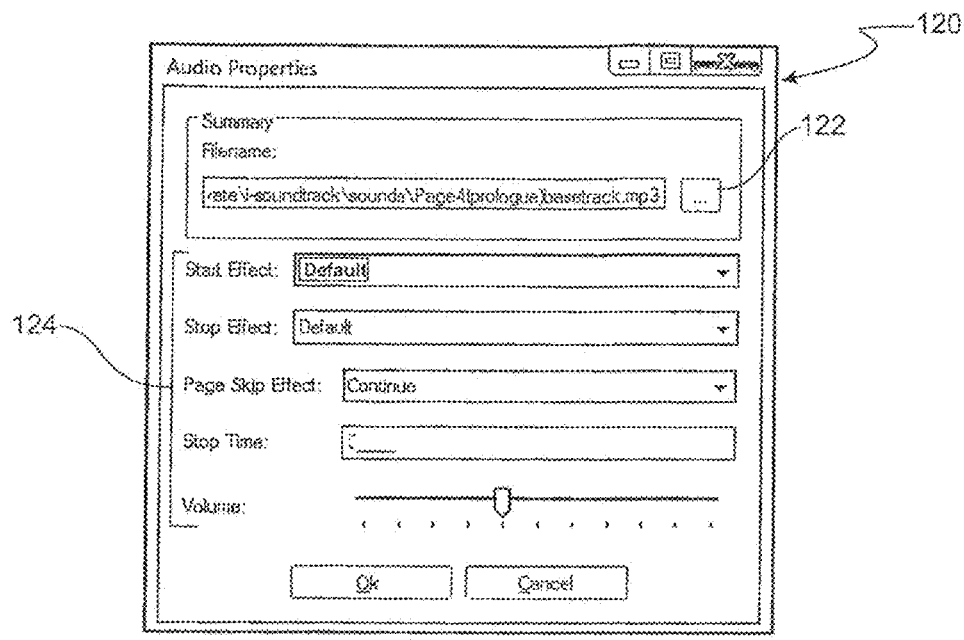
FIG. 15 is a screenshot showing the audio properties menu of the soundtrack production system software.

Referring to FIG. 15, an audio properties menu is accessible for each audio feature in the sound layers. In the preferred form, the audio properties menu 100 appears when the user clicks into the sound layer at the position they want their new audio feature to start. Once the start position in the sound layer is selected, the audio properties menu 120 appears, and the start position of the audio feature is recorded automatically. The type of start position, for example whether it is absolute or variable, depends on whether the sound layer is of the fixed reading speed type or variable reading speed type. For example, if the user selects a start position halfway through a timeslot segment in a variable reading speed sound layer, a variable start position of 50% would be recorded against the audio feature.

Figure 16:
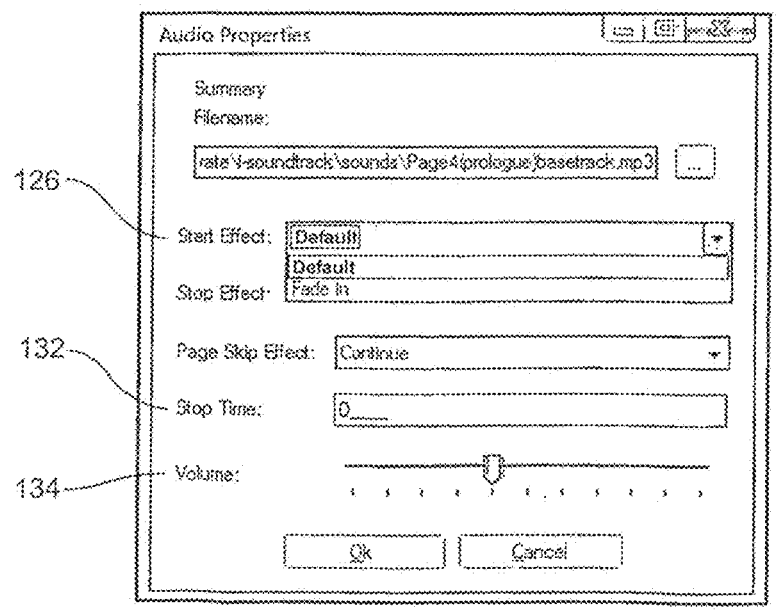
FIG. 16 is a screenshot showing the start effect options in the audio properties menu of FIG. 15.

Using the audio properties menu, the user can then select the audio file to be played at that position by accessing the file explorer button 122 to navigate their database of audio files. The user can then set various properties relating to that audio feature 124 as will now be explained further. With reference to FIG. 16, the start effect selection 126 determines if there is any effect applied to the audio file when it starts. The 'default' selection will start the audio file as per a normal start. The 'fade-in' selection will gradually fade the audio file into the soundtrack over a pre-determined fade period, such as 5 seconds for example, although this will be adjustable.

Figure 17:
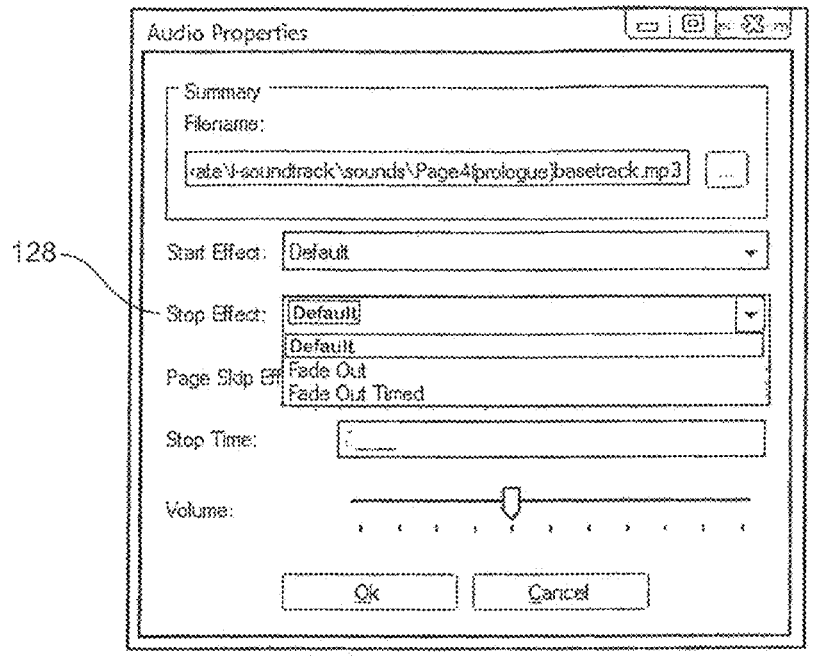
FIG. 17 is a screenshot showing the stop effect options in the audio properties menu of FIG. 15.

Referring to FIG. 17, the stop effect selection 128 determines if there is any effect applied to the audio file when it stops. An audio feature can stop if it reaches the end of the audio file, or if the next page is selected and the reader is in the middle of listening to an audio file. The 'default' selection abruptly ends the audio file. The 'fade-out' selection fades the audio file out over a pre-determined fade period, such as 5 seconds, although this is adjustable. The 'fade-out timed' selection fades the audio file out over a pre-determined adjustable fade period once an adjustable 'stop time' has elapsed determined from when the file commenced playing. Other audio property features, such as looping the audio file until the end of page, chapter or set time can also be provided in alternative forms of the system.

Figure 18:
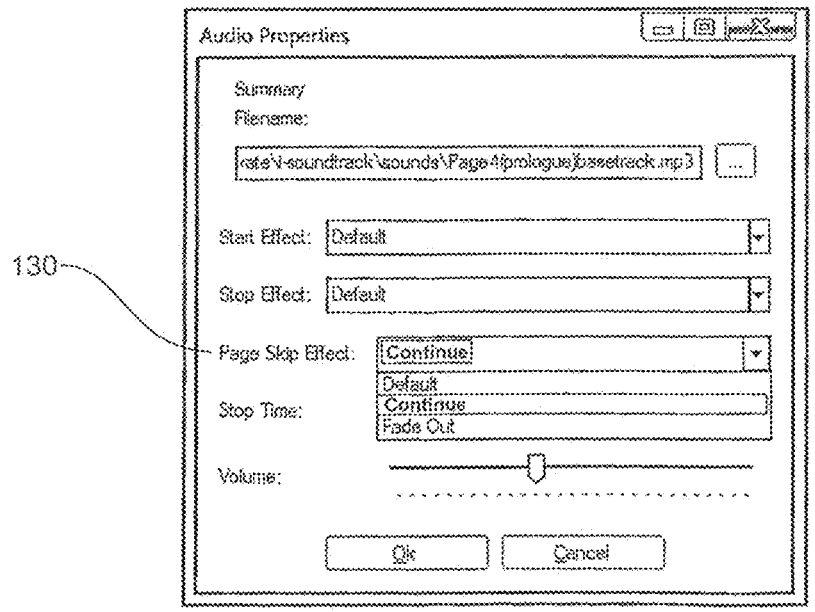
FIG. 18 is a screenshot showing the page skip effect options in the audio properties menu of FIG. 15.

Referring to FIG. 18, the page skip effect selection 130 determines what happens to the audio file if it is playing when the user clicks the 'next page' button. The 'default' selection abruptly stops the audio file playing. The 'continue' selection sets the audio file to continue to play until it finishes (or the end of the page is reached). The 'fade-out' selection sets the audio file to fade out over a predetermined fade period, such as 5 seconds, when the user selects the 'next page'. Reverting to FIG. 16, the 'stop time' selection 132 can be set to determine the duration the audio file will play for. A volume setting 134 for the audio file is also provided.

Soundtrack Playback System

Figure 19:
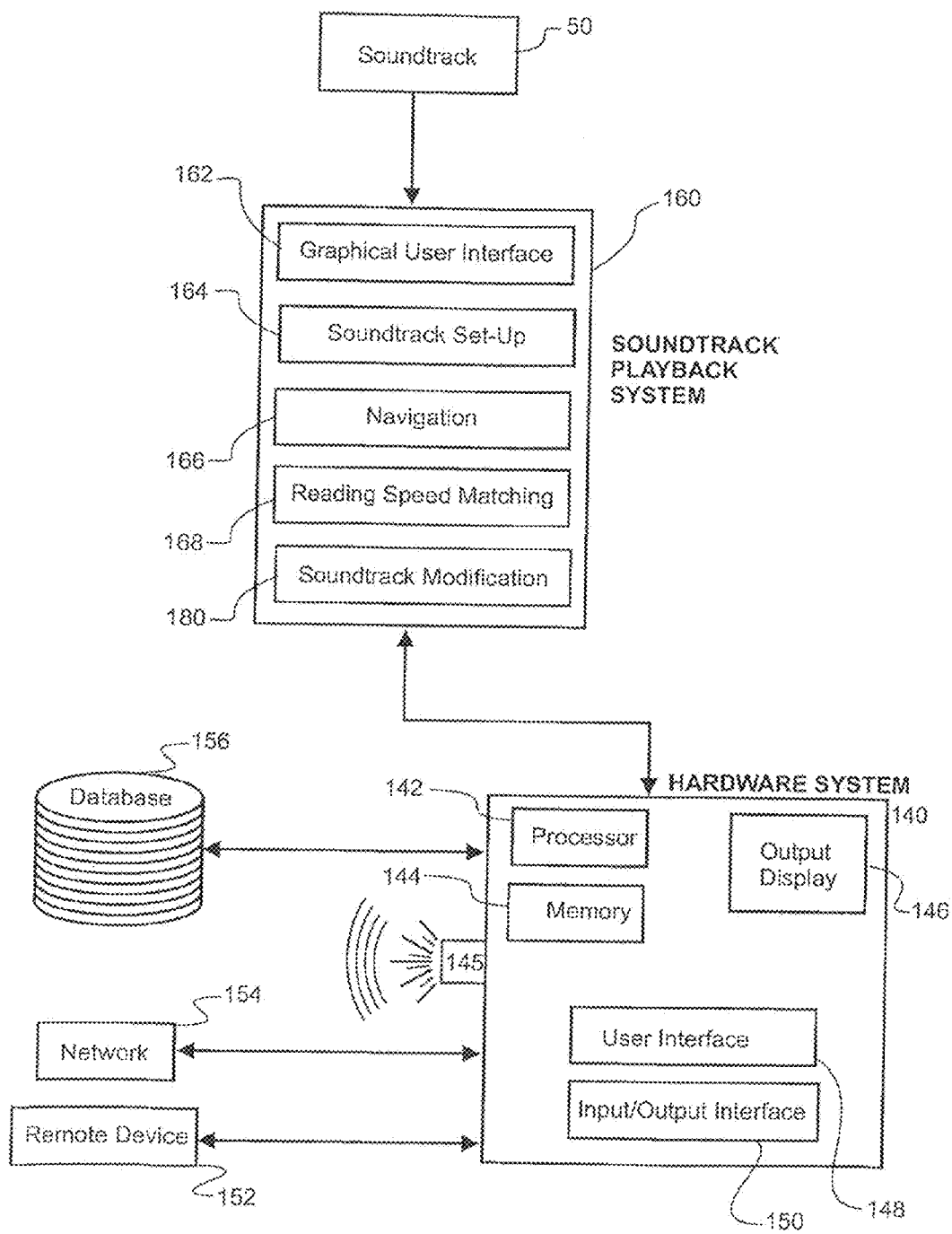
FIG. 19 is a block diagram showing a hardware system and software modules of the soundtrack playback system in accordance with a second preferred embodiment of the invention.

Referring to FIG. 19, the soundtrack 50 may be played on any form of hardware system or platform that can operate as an audio player, with audio output 145 in the form of speakers or headphones for converting the soundtrack audio output signal into audible sound. The hardware system 140 preferably comprises a processor 142 upon which the soundtrack playback system software runs, associated memory 144 for the soundtrack and software files, output display 146, a user interface 148 to enable the user to control the audio player and navigate and modify the soundtrack, and an input/output interface 150 that enables the audio player to be connected to external device, such as remote control devices 152, networks, such as the internet 154, or storage databases 156. By way of example, a hardware system may be a general purpose computer, portable digital audio player, such as an mp3 player or iPod, mobile phone, e-book or any other portable device capable of running software applications.

The soundtrack playback system software 160 main modules will now be explained. The software preferably includes a user interface in the form of a GUI 162 that runs on the output display, and which may be provided in a variety of forms to suit the particular audio player. For example, the GUI may be a simple display of the soundtrack progress, including track or page numbers, or a more complex graphical display like that shown in FIG. 10. It will be appreciated that the soundtrack playback system need not necessarily have GUI, and the user interface may be in the form of a control panel or operable buttons.

A soundtrack setup module 164 is provided to enable the user to load a soundtrack 50 which is stored in onboard memory, a connected database, or downloaded from a network connected either wirelessly or which is hardwired. The soundtrack setup module 164 is configured to retrieve the soundtrack files and interpret the data files for playback of the soundtrack. In particular, the data files of the soundtrack are used to call and play the various audio features in the sound layers of the soundtrack at the desired start positions in the soundtrack timeline. Effectively, the data files contain the information for coordinating the concurrent playback of the audio features in the multiple sound layers. The audio files may be stored in memory with the soundtrack data files or may be buffered from a network database or other storage medium. In the preferred form, at least some of the audio files associated with each audio feature of the soundtrack are provided with the package of soundtrack files.

A navigation module 166 is provided to enable the user to play, pause, fast forward, fast rewind, page skip, page backward function or other buttons to navigate the soundtrack timeline to the appropriate position within corresponding text source, such as a book. For example, if the user is reading page 4, they may skip to the corresponding 4th timeslot segment relating to that page in the soundtrack.

As mentioned, the navigation module 166 is arranged to control the transition of the soundtrack playback between two timeslot segments to correspond to the next page the user is reading. In the default mode, the soundtrack layers will pause at the beginning of the next page (timeslot segment), subject to the audio properties of the audio features in that timeslot segment and await the 'next page' input to continue. If the page transition is initiated by the user by the 'next page' input prior to the end of the timeslot segment for that page, the soundtrack will jump to the start of the next timeslot segment. In this situation, some of the audio features may continue playing subject to the audio properties previously discussed. The 'next page' button enables a user to synchronise the playback of the soundtrack with their reading of the book.

As mentioned, the page transition signal may be generated by operation of a 'next page' button on the software GUI 162 or alternatively using an allocated button on the control panel, such as the 'next track' button provided on most portable audio players. It will be appreciated that the page transition signal can be generated in various ways depending on the user interface provided by the hardware system or platform. In some forms, a remote device connected to the hardware system 140, either wirelessly or via a cable, may be arranged to provide a page transition signal in response to operation of a 'next page' button on the remote device by the user. Additionally, or alternatively, the remote device may be attachable to the book and provided with a page turn sensor that automatically generates a page transition signal in response to a page turn. In an e-book context, it will be appreciated that e-book reading software may be arranged to automatically generate page transition signals when the user scrolls to the next page or a software application may be provided to sense page navigation for text sources in the form of electronic works. In the preferred form, the remote device may comprise an output display, such as an LCD screen, which displays the current page number corresponding to timeslot segment being played in the soundtrack timeline.

The soundtrack playback system also preferably comprises a reading speed matching module 168. The reading speed matching module is arranged to receive a reading speed input from the user and modifies the position of the audio features in the variable reading speed sound layers of the soundtrack to match the reading speed set by the user. As previously described, the reading speed input may be set on a index scale, or any other system for indicating reading speed for a text chunk, such as the time required to read one page of text. This may be adjusted by the user using the user interface for example.

Figure 20:
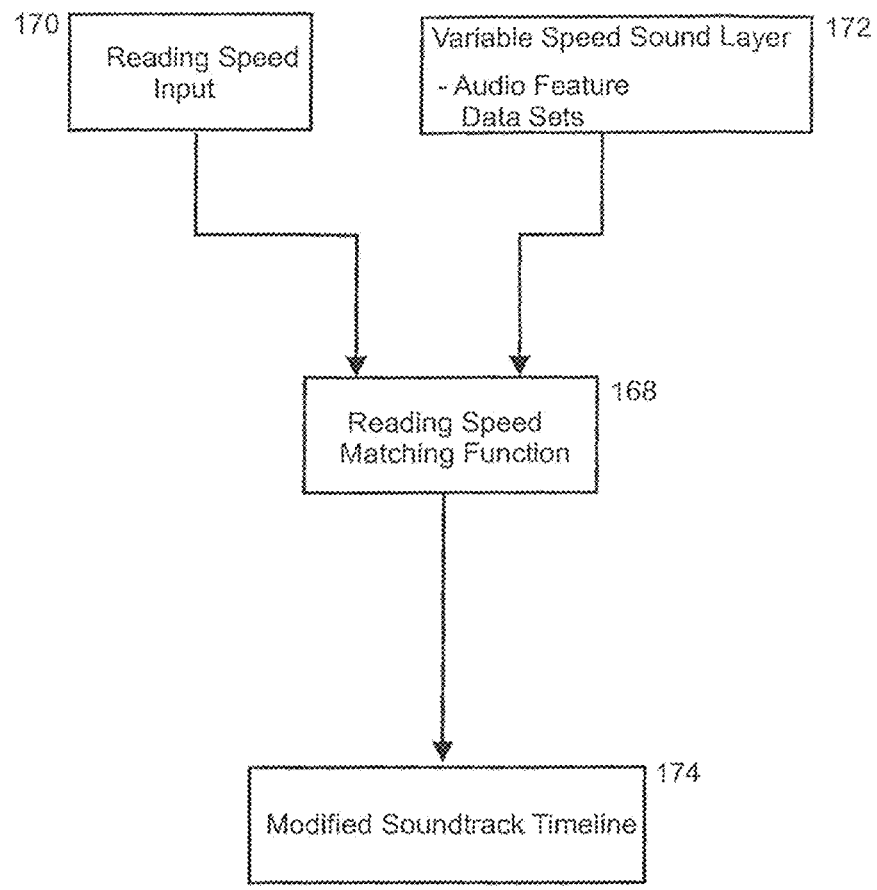
FIG. 20 is a flow diagram for the reading speed matching function of the soundtrack system in accordance with the second preferred embodiment.

Referring to FIG. 20, the reading speed matching module will be described in more detail. The reading speed matching function receives the reading speed input 170, and directly or indirectly derives the new timeslot segment period for the soundtrack timeline. The reading speed matching function 168, on initiation of a new reading speed input, retrieves the audio feature data sets relating to the variable sound layers 172. As previously described, the audio feature data sets of the variable reading speed sound layers comprise variable start positions based on the percentage of the timeslot segment period within which the audio feature begins. The reading speed matching function is arranged to shorten or lengthen the soundtrack timeline in accordance with the new timeslot segment period and then alter the absolute start positions of the audio features based on their percentage start position. The reading speed matching function then produces a modified soundtrack timeline for all the sound layers and with new audio feature start positions 174. The modified soundtrack can then be played by the user. It will be appreciated that the reading speed matching function may be arranged to alter portions of the soundtrack timeline if desired, such as the un-played portion of the remaining soundtrack if the reading speed is altered during playback.

In one form of the playback system, a dynamic or automatic reading speed input may be provided. The automatic reading speed input is calculated based on the average time between 'next page' signals from the user such that the reading speed is calculated and the soundtrack timeline dynamically updated and modified at each new page transition with averages and weightings applied over multiple pages to refine the reader's reading speed.

In some forms of the playback system, a soundtrack modification module 180 is provided as shown in FIG. 19. This module enables the user to modify the sound layers and audio features of the sound layers. The soundtrack modification module 180 may preferably have full capabilities of the soundtrack production system previously described, or a reduced version of that functionality. For example, the user may be able to have a song replacement function such that the user can replace certain audio features in specific sound layers, such as the music layer, with existing audio files from their own music library or database. In addition, there may be an automatic function to replace certain audio files with favourite songs from the user's music library or database. The user may also be able to deselect sound layers so that they are not played or muted in the soundtrack.

Advantages and Benefits of the Composite Soundtrack and System

The composite soundtrack enables the reader of a book to enjoy the reading experience in a new and novel way. The composite soundtrack, comprising multiple sound layers of sound effects, atmospheric noise and background music, plays throughout the duration of a book and the timing of audio features in some of the layers is adjustable to match the user's reading speed so that the soundtrack closely matches events as they are read. The composite soundtrack enables each sound layer to run concurrently with each other but without losing their independent audio properties such as the start/stop positions and transition effects. The composite soundtrack contains embedded properties that govern the playback of the audio features throughout the soundtrack and this enables the soundtrack to be delivered at a constant flow so as not to interrupt the reading process. In preferred forms, the soundtrack format enables the soundtrack to be configured to match the reading speed of the user without altering the sound quality, pitch or tempo of the original audio features. For example, the arrangement or position of the audio features in the soundtrack timeline can be matched to the user's reading speed without altering the sound quality, pitch or tempo of each individual audio feature.

In some forms of the soundtrack and system, the reader can personalise the soundtrack by adding songs from his or her music library to the soundtrack of a book. This may be advantageous to the reader as each reader would have a unique taste in music or different languages and one soundtrack would not be suitable to cater to the taste of readers of all ages.

The composite soundtrack has various applications. It is a text source accessory to enhance the enjoyment of reading, but could also be used as a reading aid for small children or the visually impaired. The soundtrack could have an extra variable reading speed sound layer that contains an oral reading of a book as in an audio book. Small children would find it very useful to help them learn to read and also encourage them to read in the absence of an adult.

The foregoing description describes the invention in relation to preferred embodiments. The invention is in no way limited to these preferred embodiments as they are purely to exemplify the invention only. Variations and modifications maybe made thereto without departing from the scope of the invention as defined by the accompanying claims.

The invention claimed is:

1. A method of playing a digital soundtrack to a reader on a hardware system while the reader is reading an associated electronic text source on an output display of the hardware system, the method comprising the steps of:
   (a) loading the digital soundtrack, the digital soundtrack having a soundtrack timeline and comprising at least one sound layer; said soundtrack timeline having timeslot segments that each correspond to a text chunk of the electronic text source; said sound layer having audio features to playback in each of said timeslot segments; each audio feature of the sound layer comprising an associated audio file for playback; and wherein at least some of the audio features comprise a link to an audio file that is accessible over a network connected to the hardware system for playback;
   (b) receiving a navigation signal indicative of the user's reading position within the electronic text source;
   (c) receiving a reading speed input representing the reasder's text reading speed;
   (d) accessing and retrieving for playback, via a network connection, audio files linked to audio features of the digital soundtrack; and
   (e) co-ordinating playback of the audio featured of the soundtrack over an audio output of the hardware system based on the navigation signal and the reading speed input such that the timing of playback of the audio features is synchronized to the reading of their associated text chunk in the displayed electronic text source by the reader.

2. A method of claim 1 wherein the electronic text source is an e-book and the hardware system comprises an e-book system.

3. A method of claim 1 wherein step (d) comprises accessing and retrieving audio files for playback from a music library or database accessible over the network.

4. A hardware system for playback of a digital soundtrack while a reader is reading an associated electronic text source, the hardware system comprising:
   an output display configured to display the electronic text source;
   memory;
   a network connection;
   a processor configured to:
      load and process a data file or files representing the digital soundtrack into memory, the digital soundtrack having a soundtrack timeline and comprising at least one sound layer; said sound track timeline having timeslot segments that each correspond to a text chunk of the electronic text source; said sound layer having audio features to playback in each of said timeslot segments; each audio feature of the sound layer comprising an associated audio file for playback; and wherein at least some of the audio features comprise a link to an audio file that is accessible over a network connected to the hardware system for playback;
      access and retrieve for playback, via the network connection, audio files linked to audio features of the digital soundtrack; and
      co-ordinate playback of the audio features of the digital soundtrack based on a navigation signal indicative of the reader's reading position within the electronic text source and reading speed input representing the reader's text reading speed to generate a soundtrack audio output signal in which the timing of the playback of the audio features in synchronised to the reading of their associated text chunk in the electronic text source by the reader; and
   an audio output system that is configured to receive and convert the soundtrack audio output signal into audible sound.

5. A hardware system according to claim 4 wherein the navigation signal is based on page turn signals.

6. A hardware system according to claim 4 wherein the navigation signal is based on the portion of the electronic text source displayed on the output display.

7. A hardware system of claim 4 wherein the electronic text source is an e-book and the hardware system comprises an e-book system.

8. A hardware system of claim 4 wherein the processor is configured to retrieve audio files for playback from a music library or database accessible over a network via the network connection.

9. A hardware system according to claim 4, wherein the system further comprises a navigation module that is operable by a reader via graphical user interface displayed on the output display, to update their playback position of the digital soundtrack within the soundtrack timeline to synchronise the digital soundtrack playback with their reading position in the electronic text source.

10. A hardware system according to claim 9, wherein the navigation module is configured o sense scrolling or navigation through the electronic text source by the reader and automatically update the playback position of the digital soundtrack within the soundtrack timeline to synchronise the digital soundtrack playback with their reading position in the electronic text source.

11. A hardware system according to claim 4, wherein the system further comprises a navigation module that is operable to update the reader's playback position of the digital soundtrack within the soundtrack timeline to synchronise the digital soundtrack playback with the reader's reading position in the electronic text source, and wherein the system is connected to a remote device that is operable by the reader to generate signals for the navigation module to alter their playback position within the soundtrack timeline.

12. A hardware system according to claim 4, further comprising a soundtrack modification module that is operable by a user to modify one or more audio features of the digital soundtrack prior to playback.

13. A hardware system according to claim 12, wherein the soundtrack modification module is operable by a user to insert new audio features into the soundtrack timeline and/or replace existing audio features in the soundtrack timeline with audio files from a music library, database, website, network, and/or internet accessible by the system.

14. A hardware system according to claim 12, wherein the soundtrack modification module is operable to automatically replace one or more audio features in the soundtrack timeline with audio features comprising audio files from the user's personal music library, database, website, network, and/or internet based on selection criteria.

15. A hardware system according to claim 14, wherein the selection criteria is based on popularity, genre, beat, tempo, pitch and/or mood of the audio files.

16. A hardware system according to claim 14, wherein the selection criteria comprises the type of activity occurring in a scene of the electronic text source corresponding to which the audio feature is synchronised with.

17. A hardware system according to claim 4, wherein the digital soundtrack comprises a plurality of sound layers configured to play concurrently through the soundtrack timeline, each sound layer having an arrangement of one or more audio features, and wherein the soundtrack modification module is operable by a user to deselect one or more sound layers of the digital soundtrack such that audio features of those deselected sound layers are muted during playback of the digital soundtrack.

18. A hardware system according to claim 4, wherein the system comprises any one of: a personal computer, desktop, laptop, PDA, mobile phone, e-book system, or portable audio player.

19. A hardware system according to claim 4, wherein the system is provided on a website platform accessible over the internet.

20. A hardware system according to claim 4, wherein the electronic text source is online text viewable on the output display.

21. A hardware system according to claim 4, wherein the digital soundtrack data file or files comprise at least some of the audio files associated with the audio features of the digital soundtrack, and wherein the processor is configured to retrieve the audio files from the digital soundtrack data file or files when co-ordinating playback of those audio features of the digital soundtrack.

22. A hardware system according to claim 4, wherein the audio features of the digital soundtrack comprises any one or more of the following: music, sound effects, and ambience.

* * * * *